(12) United States Patent
Kanayama et al.

(10) Patent No.: US 8,521,953 B2
(45) Date of Patent: Aug. 27, 2013

(54) STORAGE DEVICE AND A METHOD FOR EXPANDING THE SAME

(75) Inventors: Tomoyuki Kanayama, Kawasaki (JP); Shigeyuki Maeda, Kawasaki (JP); Nina Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 12/983,537

(22) Filed: Jan. 3, 2011

(65) Prior Publication Data

US 2011/0179234 A1 Jul. 21, 2011

(30) Foreign Application Priority Data

Jan. 19, 2010 (JP) ................................ 2010-009185

(51) Int. Cl.
*G06F 12/00* (2006.01)
(52) U.S. Cl.
USPC .......................................................... 711/114
(58) Field of Classification Search
None
See application file for complete search history.

(56) References Cited

U.S. PATENT DOCUMENTS

| | | | |
|---|---|---|---|
| 7,584,325 B2 * | 9/2009 | Holland et al. ............... | 711/114 |
| 7,814,241 B2 | 10/2010 | Honda | |
| 2005/0228943 A1 | 10/2005 | DeCenzo et al. | |
| 2008/0010530 A1 | 1/2008 | Davies et al. | |
| 2008/0126697 A1 * | 5/2008 | Elliott et al. .................. | 711/114 |
| 2008/0126698 A1 | 5/2008 | Honda | |
| 2009/0094620 A1 | 4/2009 | Kalwitz et al. | |
| 2009/0132866 A1 | 5/2009 | Makino | |
| 2011/0145452 A1 * | 6/2011 | Schilling et al. ................ | 710/74 |

FOREIGN PATENT DOCUMENTS

| | | |
|---|---|---|
| EP | 1 901 522 A1 | 3/2008 |
| EP | 1 975 797 A2 | 10/2008 |
| JP | 2005-293595 | 10/2005 |
| JP | 2008-71005 | 3/2008 |

OTHER PUBLICATIONS

European Patent Office Communication (Search Report) mailed May 27, 2011 for corresponding European Patent Application No. 11151061.6.

* cited by examiner

*Primary Examiner* — Hiep Nguyen
(74) *Attorney, Agent, or Firm* — Staas & Halsey LLP

(57) ABSTRACT

In a storage device expandable through serially coupling two or more additional enclosures, each including a first additional controller and a second additional controller, to a controller enclosure, including a first controller and a second controller, a first route is formed by serially coupling the first controller of the controller enclosure to the first additional controllers of the additional enclosures in the order of adding the additional enclosures and a second route is formed by serially coupling the second controller of the controller enclosure to the second additional controllers of the additional enclosures in an order different from that of adding the additional enclosures.

6 Claims, 20 Drawing Sheets

FIG. 2

| ENCLOSURE NO. (CM NO.) | CE10(CM11) | DE20-1(CM21-1) | DE20-2(CM21-2) | DE20-3(CM21-3) |
|---|---|---|---|---|
| PHY NUMBER (ACCESS ORDER) | PHY13a | PHY23-1a | PHY23-2a | PHY23-3a |
| SAS ADDRESS STORED IN ROUTE TABLE | DISCS 201-1~201-L | — | — | NOT CREATED |
|  | PHY23-2b | DISCS 202-1~202-K | — |  |
|  | DISCS 202-1~202-K | PHY23-3b | — |  |
|  | PHY23-3b | DISCS 203-1~203-J |  |  |
|  | DISCS 203-1~203-J | DISCS 203-1~203-J | DISCS 203-1~203-J |  |
|  | ↖ T11a | ↖ T21-1a | ↖ T21-2a | ↖ T21-3a |

FIG. 3

| ENCLOSURE NO. (CM NO.) | CE10(CM12) | DE20-3(CM22-3) | DE20-2(CM22-2) | DE20-1(CM22-1) |
|---|---|---|---|---|
| PHY NUMBER (ACCESS ORDER) | PHY14a | PHY24-3b | PHY24-2b | PHY24-1b |
| SAS ADDRESS STORED IN ROUTE TABLE | DISCS 203-1~203-J / PHY24-2a / DISCS 202-1~202-K / PHY24-1a / DISCS 201-1~201-L | — / DISCS 202-1~202-K / PHY24-1a / DISCS 201-1~201-L | — / — / — / DISCS 201-1~201-L | NOT CREATED |
| | ↙ T12a | ↙ T22-3b | ↙ T22-2b | ↙ T22-1b |

FIG. 7

| ENCLOSURE NO. (CM NO.) | CE10(CM11) | DE20-1(CM21-1) | DE20-2(CM21-2) | DE20-3(CM21-3) |
|---|---|---|---|---|
| PHY NUMBER (ACCESS ORDER) | PHY13a | PHY23-1a | PHY23-2a | PHY23-3a |
| SAS ADDRESS STORED IN ROUTE TABLE | DISCS 201-1~201-L<br>—<br>—<br>—<br>— | | [FAILURE]<br>NOT CREATED | NOT CREATED |
| | ↙ T11a | ↙ T21-1a | ↙ T21-2a | ↙ T21-3a |

FIG. 15

| | T11a | T21-1a | T21-2a | T21-3a | T21-4a |
|---|---|---|---|---|---|
| ENCLOSURE NO. (CM NO.) | CE10(CM11) | DE20-1(CM21-1) | DE20-2(CM21-2) | DE20-3(CM21-3) | DE20-4(CM21-4) |
| PHY NUMBER (ACCESS ORDER) | PHY13a | PHY23-1a | PHY23-2a | PHY23-3a | PHY23-4a |
| SAS ADDRESS STORED IN ROUTE TABLE | — | | [FAILURE] NOT CREATED | NOT CREATED | NOT CREATED |
|  | — | | | | |
|  | — | | | | |
|  | ALL DISCS IN STORING SECTION 28-1 | | | | |
| ENCLOSURE NO. (CM NO.) | CE10(CM11) | DE20-4(CM21-4) | DE20-3(CM21-3) | DE20-2(CM21-2) | DE20-1(CM21-1) |
| PHY NUMBER (ACCESS ORDER) | PHY13b | PHY23-4b | PHY23-3b | PHY23-2b | PHY23-1b |
| SAS ADDRESS STORED IN ROUTE TABLE | — | — | | [FAILURE] NOT CREATED | NOT CREATED |
|  | — | — | | | |
|  | PHY23-3a | — | | | |
|  | ALL DISCS IN STORING SECTION 28-3 | ALL DISCS IN STORING SECTION 28-3 | | | |

Table T12a:

| ENCLOSURE NO. (CM NO.) | CE10(CM12) | DE20-4(CM22-4) | DE20-3(CM22-3) | DE20-2(CM22-2) | DE20-1(CM22-1) |
|---|---|---|---|---|---|
| PHY NUMBER (ACCESS ORDER) | PHY14a | PHY24-4b | PHY24-3b | PHY24-2b | PHY24-1b |
| SAS ADDRESS STORED IN ROUTE TABLE | —<br>—<br>ALL DISCS IN STORING SECTION 28-4<br>PHY24-3a<br>ALL DISCS IN STORING SECTION 28-3 | —<br>—<br>— | (crossed out) | [FAILURE] NOT CREATED | NOT CREATED |

Arrows: T12a, T22-4b, T22-3b, T22-2b, T22-1b

Table T12b:

| ENCLOSURE NO. (CM NO.) | CE10(CM12) | DE20-1(CM22-1) | DE20-2(CM22-2) | DE20-3(CM22-3) | DE20-4(CM22-4) |
|---|---|---|---|---|---|
| PHY NUMBER (ACCESS ORDER) | PHY14b | PHY24-1a | PHY24-2a | PHY24-3a | PHY24-4a |
| SAS ADDRESS STORED IN ROUTE TABLE | —<br>—<br>—<br>ALL DISCS IN STORING SECTION 28-1 | (crossed out) | [FAILURE] NOT CREATED | NOT CREATED | NOT CREATED |

Arrows: T12b, T22-1a, T22-2a, T22-3a, T22-4a

STORAGE DEVICE AND A METHOD FOR EXPANDING THE SAME

CROSS-REFERENCE TO RELATED APPLICATIONS

This application is based upon and claims the benefit of priority of the prior Japanese Patent Application No. 2010-009185, filed on Jan. 19, 2010, the entire contents of which are incorporated herein by reference.

FIELD

The embodiments discussed herein are storage devices each including a controller enclosure and two or more additional enclosures serially coupled to the controller enclosure and methods for expanding the storage device by adding enclosures.

BACKGROUND

An example of a conventional storage device including discs confirming to Serial Attached SCSI (SAS) is a Redundant Arrays of Inexpensive Disks (RAID) system. Supporting a large number of discs included in the system, some storage devices each include a Controller Enclosure (hereinafter called CE) playing as a principal role in the system and a number of Drive Enclosures (hereinafter called "DE") accommodating a number of additional discs.

Since the SAS does not permit coupling in a loop shape, each controller module (hereinafter called CM) of the CE (hereinafter CE-CM) and a CM of a DE (hereinafter DE-CM) and a number of DE-CMs need to be serially coupled to one another in the order of adding the DEs so as to form a daisy chain (hereinafter called serial coupling) as illustrated in FIG. 19. However, in the event of a failure occurring in one of the DE-CMs on the access route, the CE cannot access the failure DE and the DEs downstream of the failure DEs. As one of the solutions, a conventional storage device includes redundant CE-CMs and DE-CMs (e.g., two CE-CMs and two DE-CMs) and additionally, the CE and a DE, and DEs are coupled to one another via redundant (e.g., two) routes as illustrated in FIG. 20.

Alternatively for example, a known storage system physically couples a vacant port of a controller or a switching device and vacant ports of other switching devices into a loop, which are however logically regarded as two cascaded routes by logically separating the routes by a routing table. Even when a failure occurs in either route, simple variation of the status values in the routing table allows the controller to be logically coupled to switch devices through the other route free from the failure, so that the operation of the system can be continued.

[Patent Literature 1] Japanese Patent Application Laid-Open (KOKAI) Publication No. 2008-71005

[Patent Literature 2] Japanese Patent Application Laid-Open (KOKAI) Publication No. 2005-293595

However in the above storage device, in the cases where a failure occurs in one of the DEs on the access route, that is, in the cases where the redundant DE-CMs in the failure DE become inaccessible, the CE cannot access the failure DE and additionally the DEs coupled downstream of the failure DE.

Furthermore, in the storage device coupling the controller and switching devices into a loop through the use of vacant ports of the controller and switching devices, increase in the number of switching devices complicates physical path wiring, resulting in complex wiring managing.

SUMMARY

There is provided a storage device including a controller enclosure that includes a storing section; and a first controller and a second controller that carry out redundant access control on the storing section; two or more additional enclosures, serially coupled to the controller enclosure, each of which includes an additional storing section and a first additional controller and a second additional controller that carryout redundant access control on the additional storing section; a first route through which the first controller of the controller enclosure is serially coupled to the first additional controllers of the additional enclosures; and a second route through which the second controller of the controller enclosure is serially coupled to the second additional controllers of the additional enclosures, wherein the order of coupling the first additional controllers on the first route is identical to an order of adding the additional enclosures, and the order of coupling the second additional controllers on the second route is different from the order of adding the additional enclosures.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

[FIG. 2] A diagram illustrating SAS addresses stored in route tables possessed by a CE-CM and DE-CMs on a first route of the configuration example of FIG. 1;

[FIG. 3] A diagram illustrating SAS addresses stored in route tables possessed by the CE-CM and the DE-CMs on a second route of the configuration example of FIG. 1;

[FIG. 7] A diagram illustrating SAS addresses stored in the route tables possessed by the CE-CM and the DE-CMs on the first route of the configuration example of FIG. 6;

[FIG. 15] A diagram illustrating SAS addresses stored in route tables possessed by the CE-CM and the DE-CMs on the first route of the configuration of FIG. 14;

[FIG. 16] A diagram illustrating SAS addresses stored in route tables possessed by the CE-CM and the DE-CMs on the second route of the configuration of FIG. 14;

DESCRIPTION OF THE PREFERRED EMBODIMENTS

Hereinafter, embodiments of the present invention will now be described with reference to the drawings.

Figure 1:
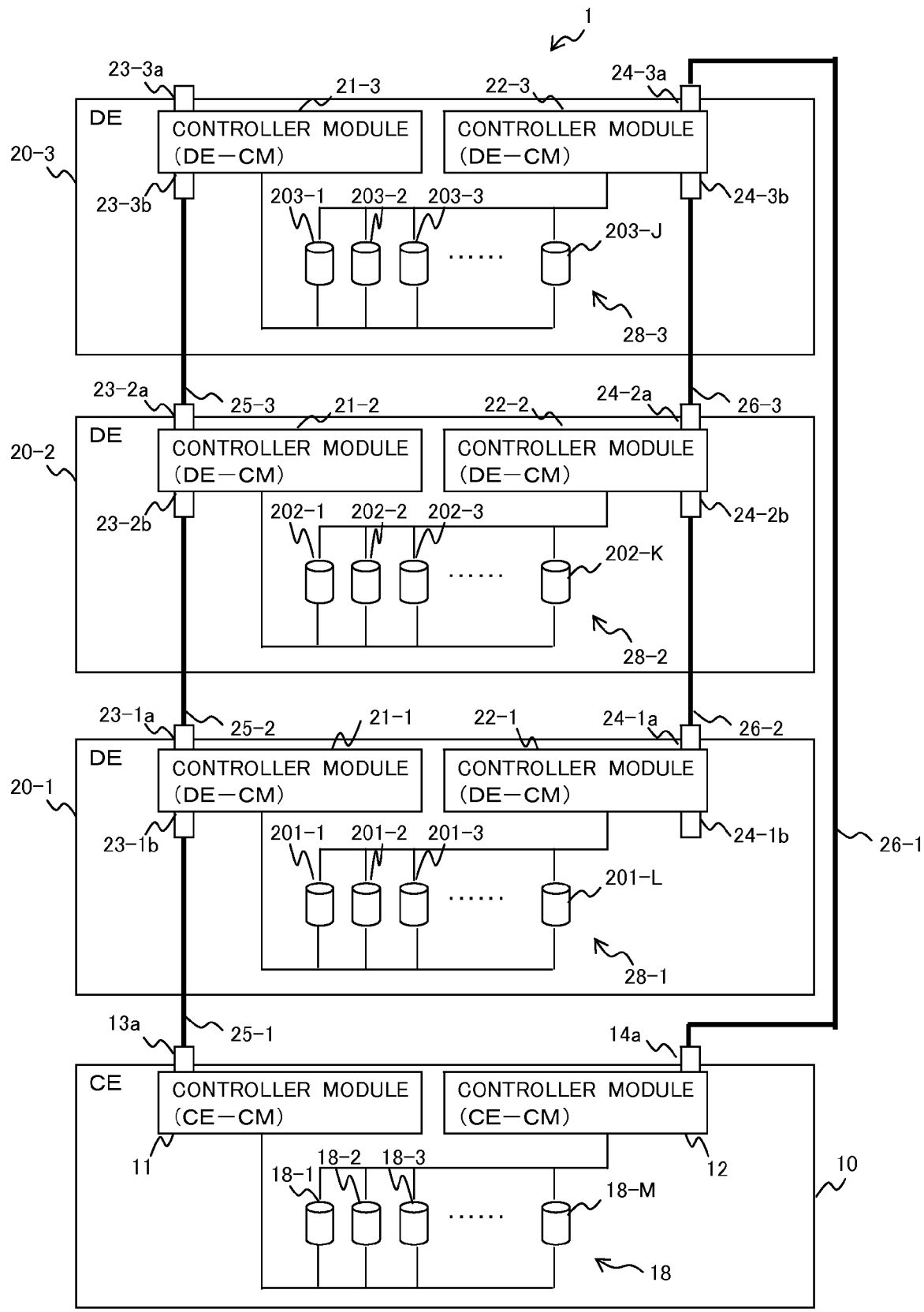
[FIG. 1] A diagram schematically illustrating an example of the configuration of a storage device according to a first embodiment.

(A) First Embodiment:

(A-1) the configuration of the first embodiment:

FIG. 1 is a diagram schematically illustrating an example of the configuration of the storage device 1 according to the first embodiment.

The storage device 1 is, for example, a RAID system.

As illustrated in FIG. 1, a CE 10 serving as a controller module includes a storing section 18, and two controllers of a CM 11 and a CM 12 that perform redundant access control on the storing section 18. Namely, the CE 10 is configured to be capable of accessing the storing section 18 mounted on the CE 10 itself by the CE-CM 11 or the CE-CM 12. Here, the storing section 18 is formed of M discs (such as HDDs) 18-1 to 18-M.

The CE-CM 11 and CE-CM 12 include a physical layer 13a and a physical layer 14a, respectively, and have a function of accessing DEs 20-1 through 20-3 through the respective physical layers 13a and 14a. Hereinafter, each physical layer is abbreviated to "PHY".

The DE 20-1 serving as an additional module, includes a storing section 28-1 and two controllers of a DE-CM 21-1 and a DE-CM 22-1 that perform redundant access control on the storing section 28-1. Namely, the DE 20-1 is configured to be capable of accessing the storing section 28-1 mounted on the DE 20-1 itself by the DE-CM 21-1 or the DE-CM 22-1. Here, the storing section 28-1 is formed of L discs (such as HDDs) 201-1 through 201-L.

The DE 20-2 serving as an additional module, includes a storing section 28-2 and two controllers of a DE-CM 21-2 and a DE-CM 22-2 that perform redundant access control on the storing section 28-2. Namely, the DE 20-2 is configured to be capable of accessing the storing section 28-2 mounted on the DE 20-2 itself by the DE-CM 21-2 or the DE-CM 22-2. Here, the storing section 28-2 is formed of K discs (such as HDDs) 202-1 through 202-K.

The DE 20-3 serving as an additional module , includes a storing section 28-3 and two controllers of a DE-CM 21-3 and a DE-CM 22-3 that perform redundant access control on the storing section 28-3. Namely, the DE 20-3 is configured to be capable of accessing the storing section 28-3 mounted on the DE 20-3 itself by the DE-CM 21-3 or the DE-CM 22-3. Here, the storing section 28-3 is formed of J discs (such as HDDs) 203-1 through 203-J.

The DE-CM 21-1 includes two PHYs 23-1a and 23-1b through which the DE-CM 21-1 has a function to access downstream DEs. The DE-CM 21-2 includes two PHYs 23-2a and 23-2b through which the DE-CM 21-2 has a function to access downstream DEs. The DE-CM 21-3 includes two PHYs 23-3a and 23-3b through which the DE-CM 21-3 has a function to access downstream DEs.

Similarly, the DE-CM 22-1 includes two PHYs 24-1a and 24-1b through which the DE-CM 22-1 has a function to access downstream DEs. The DE-CM 22-2 includes two PHYs 24-2a and 24-2b through which the DE-CM 22-2 has a function to access downstream DEs. The DE-CM 22-3 includes two PHYs 24-3a and 24-3b through which the DE-CM 22-3 has a function to access downstream DEs.

The DEs 20-1 through 20-3 are approximately the same in configuration and in function. So, one of the DEs is specified by a reference number 20-1, 20-2, or 20-3 if required, but an arbitrary DE is represented by a reference number 20.

The DE-CMs 21-1 to 21-3 and 22-1 to 22-3 are approximately the same in configuration and in function. So, one of the DE-CMs is specified by a reference number 21-1, 21-2, 21-3, 22-1, 22-2, or 22-3 if required, but an arbitrary DE-CM is represented by a reference number 21 or 22.

Furthermore, the PHYs 23-1a through 23-3a, 23-1b through 23-3b, 24-1a through 24-3a, and 24-1b through 24-3b are approximately same in configuration and in function. So, one of the PHYs is specified by a reference number 23-1a, 23-2a, 23-3a, 23-1b, 23-2b, 23-3b, 24-1a, 24-2a, 24-3a, 24-1b, 24-2b, or 24-3b if required, but an arbitrary PHY is represented by a reference number 23 or 24, otherwise 23a, 23b, 24a, or 24b.

The discs 18-1 through 18-M, 201-1 through 201-L, 202-1 through 202-K, and 203-1 through 203-J are approximately the same in configuration and in function. So one of the discs is specified by a reference number 18-1 through 18-M, 201-1 through 201-L, 202-1 through 202-K, or 203-1 through 203-J if required, but an arbitrary disc is represented by a reference number 18, 201, 202, or 203.

The storage device 1 illustrated in FIG. 1 is expanded by serially coupling three DEs 20 to the CE 10.

At that time, the PHY 13a of the CE-CM 11 is coupled to the PHY 23-1b of the DE-CM 21-1 by a cable 25-1; the PHY 23-1a of the DE-CM 21-1 is coupled to the PHY 23-2b of the DE-CM 21-2 by a cable 25-2; and the PHY 23-2a of the DE-CM 21-2 is coupled to the PHY 23-3b of the DE-CM 21-3 by a cable 25-3. The PHY 23-3a of the DE-CM 21-3 is a vacant port.

On the other hand, the PHY 14a of the CE-CM 12 is coupled to the PHY 24-3a of the DE-CM 22-3 by a cable 26-1; the PHY 24-3b of the DE-CM 22-3 is coupled to the PHY 24-2a of the DE-CM 22-2 by a cable 26-3; and the PHY 24-2b of the DE-CM 22-2 is coupled to the PHY 24-1a of the DE-CM 22-1 by a cable 26-2. The PHY 24-1b of the DE-CM 22-1 is a vacant port.

Accordingly, as illustrated in FIG. 1, the CE-CM 11 is serially coupled to, in sequence, the DE-CM 21-1, the DE-CM 21-2, and the DE-CM 21-3, that is, the order of the addition of these DEs; and the CE-CM 12 is serially coupled to, in sequence, the DE-CM22-3, the DE-CM22-2, and the DE-CM22-1, that is, the inverse order of the addition of these DEs in the first embodiment.

In other words, an access route formed by serially coupling of the CE-CM 11 and the DE-CMs 21 comes to be the reverse order of an access route formed by serially coupling of the CE-CM 12 and the DE-CMs 22.

Hereinafter, the access route of the CE-CM 11 and the DE-CMs 21 is sometimes referred to as a first route, and the other access route of the CE-CM 12 and the DE-CMs 22 is sometimes referred to as a second route.

The storage device 1 of FIG. 1 includes three DE 20, but the number of DEs 20 should by no means be limited to three.

Here, the storage device 1 of the first embodiment adopts SAS. Hereinafter, the configurations of the CE 10 and each DE 20 will now be detailed with reference to FIGS. 2 through 5.

First of all, a route table is detailed with reference to FIGS. 2 and 3.

A route table is used when the CE-CMs 11 and 12 and the DE-CMs 21 and 22 determine access routes to discs and PHYs in one or more DEs 20 coupled to downstream the CMs in question in the storage device 1 which adopts SAS. This route table is created one for a PHY of each of the CE-CMs 11 and 12 and the DE-CMs 21 and 22.

The route tables are created by route table creating sections 112, 122, 212-1 through 212-3, and 222-1 through 222-3 included in the CE-CMs 11 and 12 and the DE-CMs 21 and 22, respectively. A route table is created when the storage device 1 is started and is also created or updated when the coupling configuration of SAS devices varies when, for example, one of CMs becomes inaccessible due to addition, removal, or failure of one of the SAS devices.

FIG. 2 is a diagram illustrating SAS addresses stored in the route tables T11a and T21-1a through T21-3a respectively possessed by the CE-CM 11 and the DE-CM 21-1 through 21-3 on the first route of the configuration example in FIG. 1.

FIG. 3 is a diagram illustrating SAS addresses stored in the route tables T12a and T22-1b through T22-3b respectively possessed by the CE-CM 12 and the DE-CMs 22-1 through 22-3 on the second route of the configuration example in FIG. 1.

Figure 4:
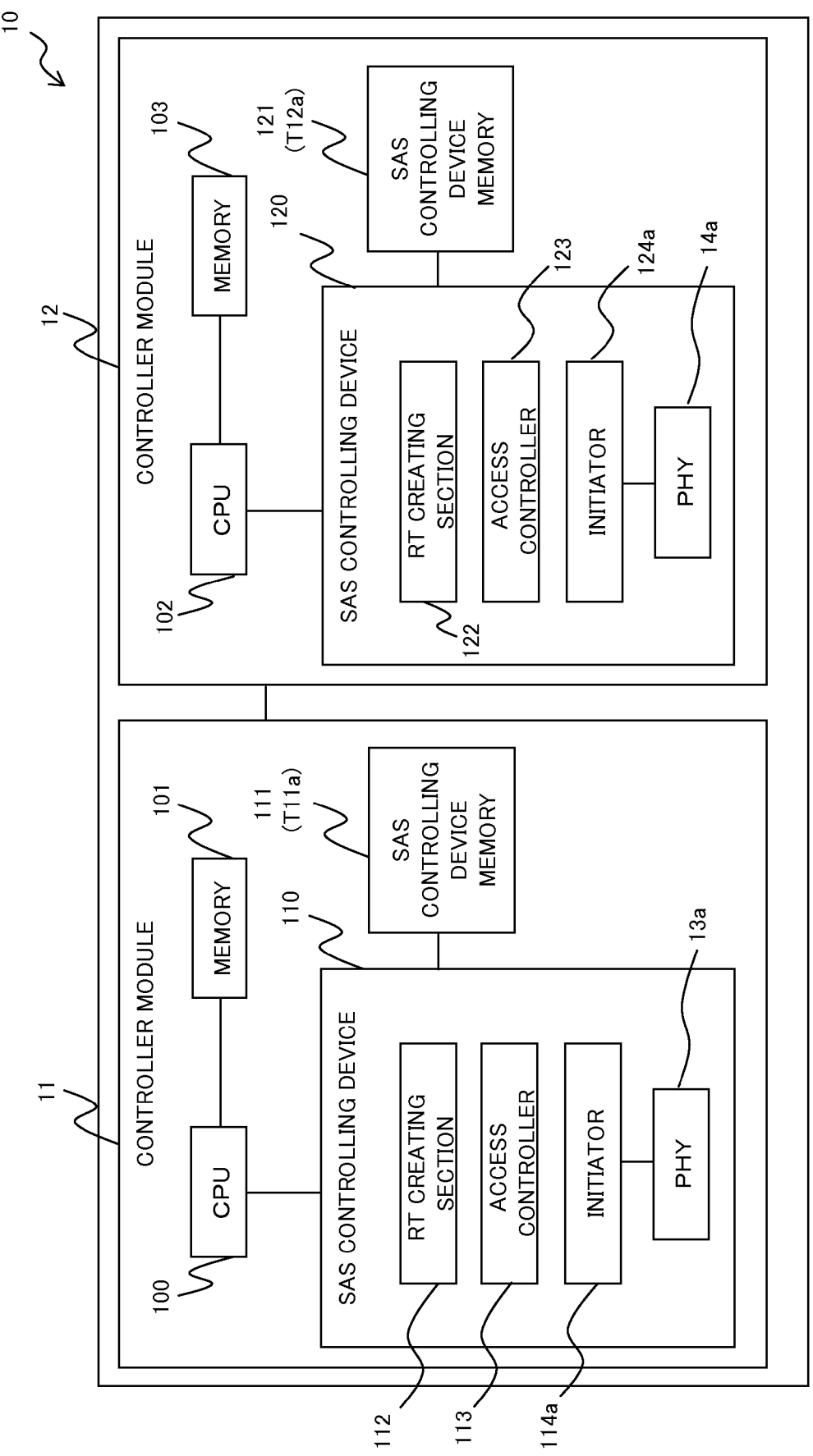
[FIG. 4] A block diagram illustrating an example of the configuration of a CE of the first embodiment.

Each of the PHYs 13, 14, 23, and 24 of the CE 10 and the DEs 20 is associated with route tables storing SAS addresses all the SAS devices that the same PHY can access, as illustrated in FIGS. 2 and 3. FIG. 4 is a block diagram illustrating an example of the configuration of the CE 10 of the first embodiment.

As illustrated in FIG. 4, the CE 10 includes the CE-CMs 11 and 12. The storing section 18 is omitted in FIG. 4.

The CE 10 is coupled to a non-illustrated host device. The CE 10 causes the CE-CM 11 or 12 to perform read/write processing from/into the storing sections 18 and 201 through 203 in the CE 10 and the DEs 20 in response to a read/write request issued from the host device, and returns the result of the read/write processing to the host device.

The CE-CM 11 includes a CPU 100, a memory 101, an SAS controlling device 110, and an SAS controlling device memory 111. The CE-CM 12 likewise includes a CPU 102, a memory 103, an SAS controlling device 120, and an SAS controlling device memory 121.

The CPUs 100 and 102 each have a function of executing processing in response to a read/write request that the CE 10 receives from the host device, and the detailed description thereof is omitted here.

The memories 101 and 103 each serve as a memory for processing in the CPUs 100 and 102. The memories 101 and 103 may be incorporated in the CPUs 100 and 102, respectively.

The SAS controlling devices 110 and 120 each control access to the SAS device, i.e., the storing section (discs) 18, that the CE 10 includes. The SAS controlling devices 110 and 120 also each have a function of controlling access to the SAS devices coupled to the CE-CMs 11 and 12, i.e., the DE-CMs 21 and 22 and the storing sections 28-1 through 28-3 (discs 201 through 203) of the DE-CMs 21 and 22, and concurrently have a function of managing the route tables T11a and T12a to access the SAS devices coupled to the CE-CMs 11 and 12, respectively.

The SAS controlling device memories 111 and 121 store information that is to be used by the SAS controlling devices 110 and 120, respectively. Furthermore, the SAS controlling device memories 111 and 121 function as route table storing sections that stores the route table T11a of the PHY 13a of the CE-CM 11 created by the route table creating section 112 or the route table T12a of the PHY 14a of the CE-CM 12 created by the route table creating section 122, respectively. Hereinafter, the SAS controlling device memories 111 and 121 are sometimes called the route table storing sections 111 and 121, respectively. The SAS controlling device memories 111 and 121 may be incorporated in the SAS controlling device 110 and 120, respectively.

The SAS controlling device 110 includes the route table creating section 112, an access controller 113, an initiator 114a, and the above-mentioned PHY 13a. Likewise, the SAS controlling device 120 includes the route table creating section 122, an access controller 123, an initiator 124a, and the above-mentioned PHY 14a.

Upon the SAS controlling devices 110 and 120 detect starting of the storage device 1 or a variation in coupling configuration of SAS devices, the route table creating sections 112 and 122 creates route tables T11a and T12a storing SAS addresses of SAS devices currently accessible from the CE-CMs 11 and 12, respectively.

For example, the route table T11a that the route table creating section 112 of the CE-CM 11 creates when the storage device 1 has the configuration of FIG. 1 stores SAS addresses described in the columns of the "PHY 13a" in FIG. 2; and the route table T12 a that the route table creating section 122 of the CE-CM 12 when the storage device 1 has the configuration of FIG. 1 stores SAS addresses described in the columns of the "PHY 14a" in FIG. 3. The route tables T11a and T12a can be created in any method already known and the detailed explanation of the methods is omitted here.

On the basis of the route table T11a stored in the route table storing section 111, the access controller 113 determines the access route to access the discs 201 through 203 along the first route. In the same manner, on the basis of the route table T12a stored in the route table storing section 121, the access controller 123 determines the access route to access the discs 201 through 203 along the second route. The access controllers 113 and 123 instructs the initiator 114 or 124a, that is to be detailed below, corresponding to the determined access route to access the discs 201 through 203 to be accessed.

In the event that the host device issues a request for access to a particular disc, the access controllers 113 and 123 refer to the respective route tables T11a and T12a to confirm whether the route tables store the SAS address of the particular disc that is to be accessed. When the route table T11a or T12a stores the SAS address of the disc to be accessed, the access controller 113 or 123 instructs the initiator 114a or 124a that can access the disc to access the disc.

When both route tables T11a and T12a store the SAS address of the disk to be accessed, in other words, when the disc can be accessed through both the first route and the second route, the access controllers 113 and 123 determine one of the first and the second routes to be the access route according to predetermined conditions. Otherwise, the access controllers 113 and 123 may be configured to determine one of the first and the second routs to be the access route at any arbitrary time point, for example, when the CE 10 is designed or is put into practice.

Determination of the access route by the access controllers 113 and 123 according to predetermined conditions may be realized in any known method, but the detailed description of the methods is omitted here.

The initiator 114a or 124a accesses (e.g., for issue of a read/write instruction) to discs 201 through 203 of the DE-CM 21 or 22 through the first route or the second route via the PHY 13a or the PHY 14a.

Figure 5:
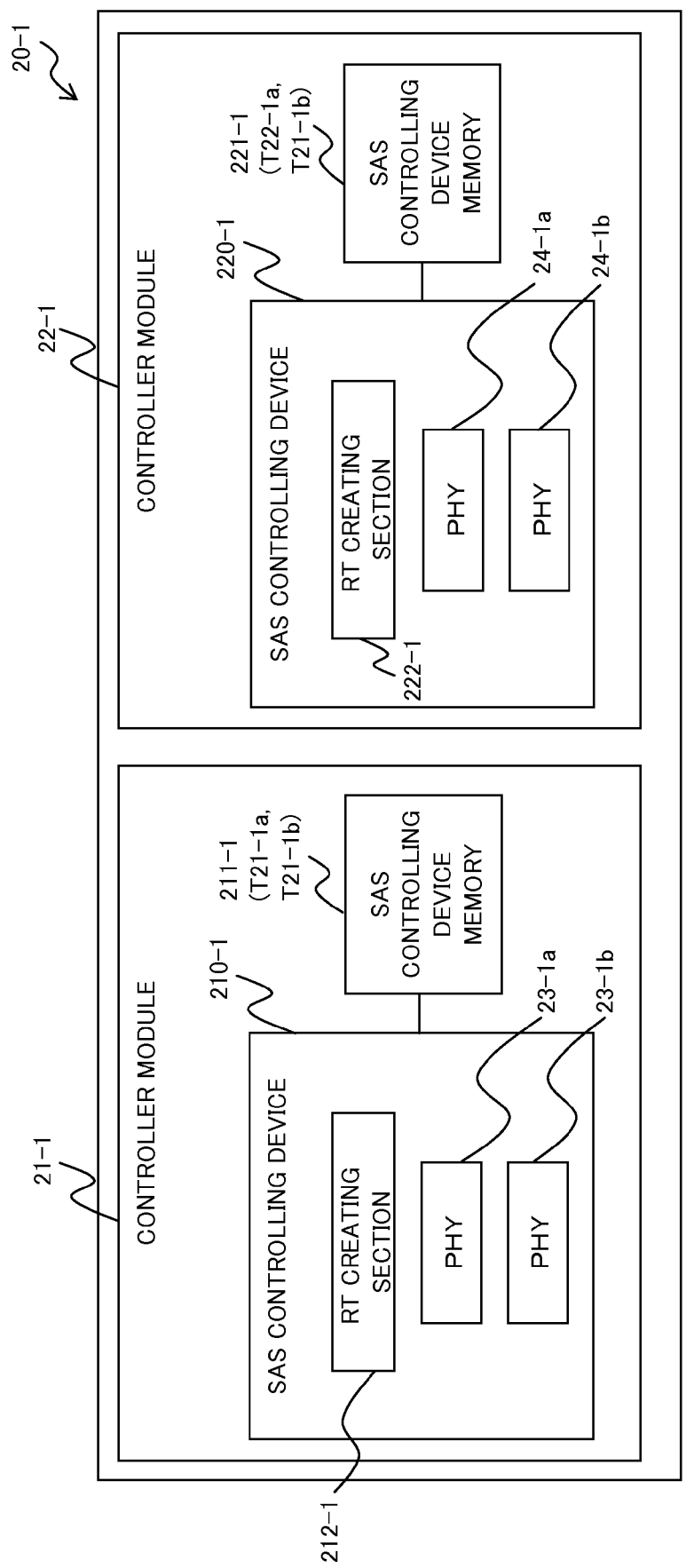
[FIG. 5] A block diagram illustrating an example of the configuration of a DE of the first embodiment.

FIG. 5 is a block diagram schematically illustrating an example of the configuration of the DE 20-1 of the first embodiment.

FIG. 5 illustrates the configuration of the DE 20-1, which is one of the three identical Drive Enclosures 20-1 through 20-3. The configuration of the DE 20-2 and 20-3 can be illustrated by replacing the number "1" on the right of the "- (hyphen)" respectively with "2" or "3" in the drawing.

As illustrated in FIG. 5, the DE 20-1 includes the DE-CM 21-1 and 22-1. The storing section 28-1 is omitted in FIG. 5.

The DE-CM 21-1 includes an SAS controlling device 210-1 and SAS controlling device memory 211-1. Likewise, the DE-CM 22-1 includes an SAS controlling device 220-1 and SAS controlling device memory 221-1.

The SAS controlling device 210-1 controls access to the SAS device that the DE 20-1 possesses, i.e., the storing section (discs) 28-1. The SAS controlling device 210-1 further has a function of controlling access to the SAS devices coupled to downstream of the DE-CM 21-1, that is the storing sections 28-2 and 28-3 of the DE-CMs 21-2 and 21-3, and the DE-CMs 22-2 and 22-3, and a function of managing the route tables T21-1a and T21-1b to access the SAS devices coupled to the DE-CMs 21-2 and 21-3. Likewise the SAS controlling device 210-1, the SAS controlling device 220-1 controls access to the SAS device that the DE 20-1 possesses, i.e., the storing section (discs) 28-1 and concurrently, has a function of managing route tables T22-1a and T22-1b to access to the SAS device coupled to downstream of the DE-CM 22-1 . In the example of the configuration of the storage device 1 illustrated in FIG. 1, the DE-CM 22-1 is the control module disposed the most downstream on the second route. With this configuration, the SAS controlling device 220-1 cannot access other DE-CMs and the storing sections thereof.

The SAS controlling device memories 211-1 and 221-1 store information that is to be used by the SAS controlling devices 210-1 and 220-1, respectively. For example, the SAS controlling device memory 211-1 functions as a route table storing section that stores the route table T21-1a associated with the PHY 23-1a of the DE-CM 21-1 created by a route table creating section 212-1 to be detailed below, and likewise the SAS controlling device memory 221-1 functions as a route table storing section that stores the route table T22-1b associated with the PHY 24-1b of the DE-CM 22-1 created by a route table creating section 222-1 to be detailed below. Hereinafter, the SAS controlling device memories 211-1 and 221-1 are sometimes called the route table storing sections 211-1 and 221-1. The SAS controlling device memories 211-1 and 221-1 may be incorporated in the SAS controlling devices 210-1 and 220-1, respectively.

The SAS controlling device 210-1 includes a route table creating section 212-1, the PHYs 23-1a and 23-1b. Likewise, the SAS controlling device 220-1 includes a route table creating section 222-1, the PHYs 24-1a and 24-1b.

Upon the SAS controlling devices 210-1 and 220-1 detect starting of the storage device 1 or a variation in coupling configuration of SAS devices, the route table creating sections 212-1 and 222-1 create route tables T21-1a and T22-1b that store SAS addresses of SAS devices currently accessible from the DE-CMs 21-1 and 22-1, respectively.

The specification of an SAS does not create a route table T21-3a because, in the configuration of the storage device 1 of FIG. 1, no enclosure is coupled to the PHY 23-3a of DE-CM 21-3 that is disposed the most downstream on the first route, and also does not create a route table T22-1b because, in the configuration of the storage device 1 of FIG. 1, no enclosure is coupled to the PHY 24-1b of DE-CM 22-1 that is disposed the most downstream on the second route. Accordingly, in the example of the configuration of the storage device 1 in FIG. 1, the DE-CMs 21 create the route tables T21-1a and T21-2a associated with the PHYs disposed downstream on the first route, i.e., the PHY 23-1a of the DE-CM 21-1 and the PHY 23-2a of the DE-CM 21-2, respectively. Likewise, the DE-CMs 22 create the route tables T22-3b and T22-2b associated with the PHYs disposed downstream on the second route, i.e. , the PHY 24-3b of the DE-CM 22-3 and the PHY 24-2b of the DE-CM 22-2, respectively.

For example, the route table T21-1a created by the route table creating section 212-1 of the DE-CM 21-1 when the storage device 1 has the configuration of FIG. 1 stores the SAS addresses of the columns of the PHY number "PHY23-1a" in FIG. 2. In contrast, when the storage device 1 has the configuration of FIG. 1, the route table creating section 222-1 of the DE-CM 22-1 does not create a route table T22-1b, resulting in the absence of a route table associated with PHY 24-1b of the DE-CM 22-1 in FIG. 3 . The route table T21-1a can be created in any known method, and the detailed description of the methods is omitted here.

The route table creating sections 212-1 through 212-3 and 222-1 through 222-3 are approximately the same in configuration and in function. Hereinafter, one of the route table creating sections is specified by the reference number of 212-1, 212-2, 212-3, 222-1, 222-2, or 222-3, if required, but an arbitrary route table creating section is represented by a reference number 212 or 222.

The route tables T21-1a, T22-1b, T21-2a, T22-2b, T21-3a, and T22-3b are the same in format. Hereinafter, one of the route tables is specified by the reference number T21-1a, T22-1b, T21-2a, T22-2b, T21-3a, or T22-3b, if required, but an arbitrary route table is represented by a reference number T21 and T22.

(A-2) Operation of the Storage Device When a Failure Occurs in a DE in the First Embodiment:

In the storage device 1 having the above configuration, even in the event of failure of one of the DEs on the access route, in other words, even in the event of one of the redundant DE-CMs becoming inaccessible, the storage device 1 can keep functioning.

Hereinafter, the operation of the storage device 1 when a failure occurs in one of the DEs will now be described with reference to FIGS. 6 through 8.

Figure 6:
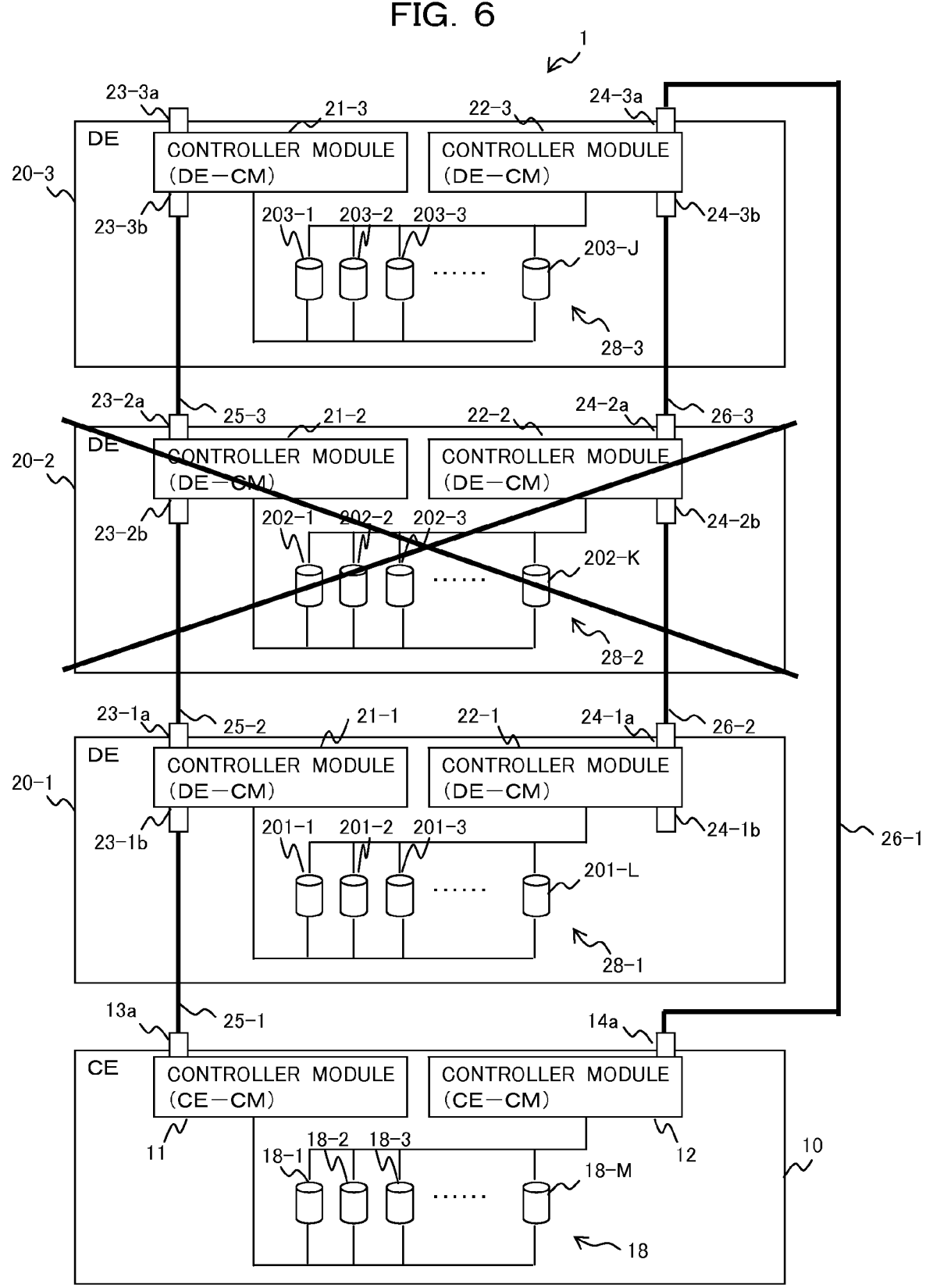
[FIG. 6] A diagram illustrating an example of the configuration of the storage device of FIG. 1 when a failure occurs in one of the DEs.

FIG. 6 is a diagram schematically illustrating an example of the configuration of the storage device 1 of FIG. 1, assuming that a failure occurs in the DE 20-2.

FIG. 7 is a diagram illustrating an SAS addresses stored in the route tables T11a, T21-1a, and T21-3a possessed by the CE-CM 11 and DE-CMs 21 on the first route when a failure occurs in the DE 20-2 in the configuration example illustrated in FIG. 6.

Figure 8:
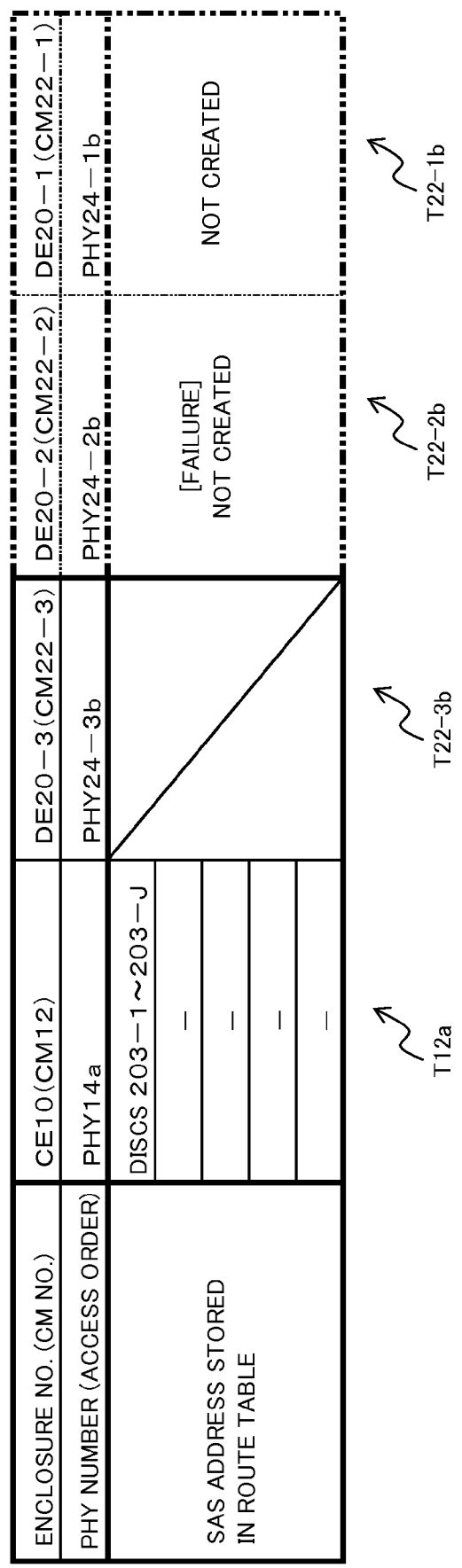
[FIG. 8] A diagram illustrating SAS addresses stored in the route tables possessed by the CE-CM and the DE-CMs on the second route of the configuration example of FIG. 6.

FIG. 8 is a diagram illustrating SAS addresses stored in the route tables T12a, T22-1b, and T22-3b possessed by the CE-CM 12 and DE-CMs 22 on the second route when a failure occurs in the DE 20-2 illustrated in FIG. 6.

In FIG. 6, upon the SAS controlling devices 110, 120, 210-1, 220-1, 210-3, and 220-3 in the CE 10, the DE 20-1, and the DE 20-3 detect variation in coupling configuration of the SAS devices due to the failure of the DE 20-2, the route table creating sections 112, 122, 212-1, 222-1, 212-3, and 222-3 each update the respective route tables T11a, T12a, T21-1a, T22-1b, T21-3a, and T22-3b storing the SAS addresses of the SAS devices currently accessible.

As illustrated in FIGS. 6 and 7, route tables associated with the PHY 23-2a and 24-2b of the failure DE 20-2 are not created, and, since no enclosure is coupled downstream of the PHY 24-1b of the DE 20-1 and the PHY 23-3a of the DE 20-3, the specification of the SAS does not create route tables associated with these PHYs. Furthermore, since the PHY 23-1a of the DE 20-1 and the PHY 24-3b of the DE 20-3 have no SAS device that these PHYs can access due to the failure of DE 20-2, which is a coupling destination of these PHYs, the route tables associated with these PHYs do not store an SAS address of an accessible SAS.

As a consequence, the PHYs 13, 14, 23, and 24 of the CE 10 and the DEs 20 are associated with respective route tables storing SAS addresses of all the accessible SASs that can be accessed from the respective PHYs 13, 14, 23, and 24, as illustrated in FIGS. 7 and 8.

The CE-CM 11 obtains the SAS addresses of the "discs 201-1 through 201-L" described in the columns of the PHY number "PHY 13a" on the first route of FIG. 7 from the route table T11a created in the above manner and stored in the route table storing section 111. Likewise, the CE-CM 12 obtains the SAS addresses of the "discs 203-1 through 203-J" described in the columns of the PHY number "PHY 14a" on the second route of FIG. 8 from the route table T12a created in the above manner and stored in the route table storing section 121.

In succession, the access controller 113 of the CE-CM 11 and the access controller 123 of the CE-CM 12 determines an access route that can access the disc to be accessed therethrough on the basis of the respective route tables stored in the route table storing sections 111 and 121. The access controllers 113 and 123 notify, the initiator 114a or 124a on the specified route, of processing on the disc to be accessed.

For example, when the host device issues a read request for the disc 201-2 of the DE 20-1 to the CE 10, the access controllers 113 and 123 refer to the route tables T11a and T12a stored in respective route table storing sections 111 and 121. The access controller 113 consequently finds the SAS address of the disc 201-2 of the DE 20-1 in the route table T11a (see FIG. 7) and determines the first route to be the access route to accomplish the read request.

When the host device issues a read request for the disc 203-J of the DE-20-3 to the CE 10, the access controllers 113 and 123 refer to the route tables T11a and T12a stored in respective route table storing sections 111 and 121. The access controller 123 consequently finds the SAS address of the disc 203-J of the DE 20-3 in the route table T12a (see FIG. 8) and determines the second route to be the access route to accomplish the read request.

After the determination of the access route in the access controller 113 or 123, the same access controller 113 or 123 notifies the read request from the host device to the corresponding initiator 114a or 124a, which then issues the read request for reading the disc to the DE-CM 21 or 22 through the PHY 13a or 14a.

For the above, even in the event of a failure of the entire DE 20-2 due to some reason as illustrated in FIG. 6, the CE-CM 11 of the CE 10 can access to the DE-CM 21-1 of the DE 20-1 via the PHY 13a and PHY 23-1b through the first route, and can therefore carry out processing on the storing section 28-1.

Through the second route wired differently in route from the first route, the CE-CM 12 of the CE 10 can access the DE-CM 22-3 of the DE 20-3 via the PHY 14a and the PHY 24-3a, and can therefore carry out processing on the storing section 28-3.

As a result, even when a failure occurs in the DE 20-2 of the storage device 1 of FIG. 6, selectively using the first or second route on the basis of the route tables T11a and T12a created by the route table creating sections 112 and 122 after the failure makes it possible to access the discs 201 of the DE 20-1 and further access the discs 203 of the DE 20-3 added after the addition of the failure DE 20-2.

As described above, even when a failure occurs in one of the DEs on the access route, the simple configuration of the storage device 1 of the first embodiment can access all the remaining DEs, i.e., DEs other than the failure DE, thereby minimizing the influence of the failure of the DE on the operation of the storage device.

(A-3) Method of Adding Another DE in the First Embodiment:

Next, description will now be made in relation to the procedure of adding another DE in the first embodiment with reference to FIG. 9.

Figure 9:
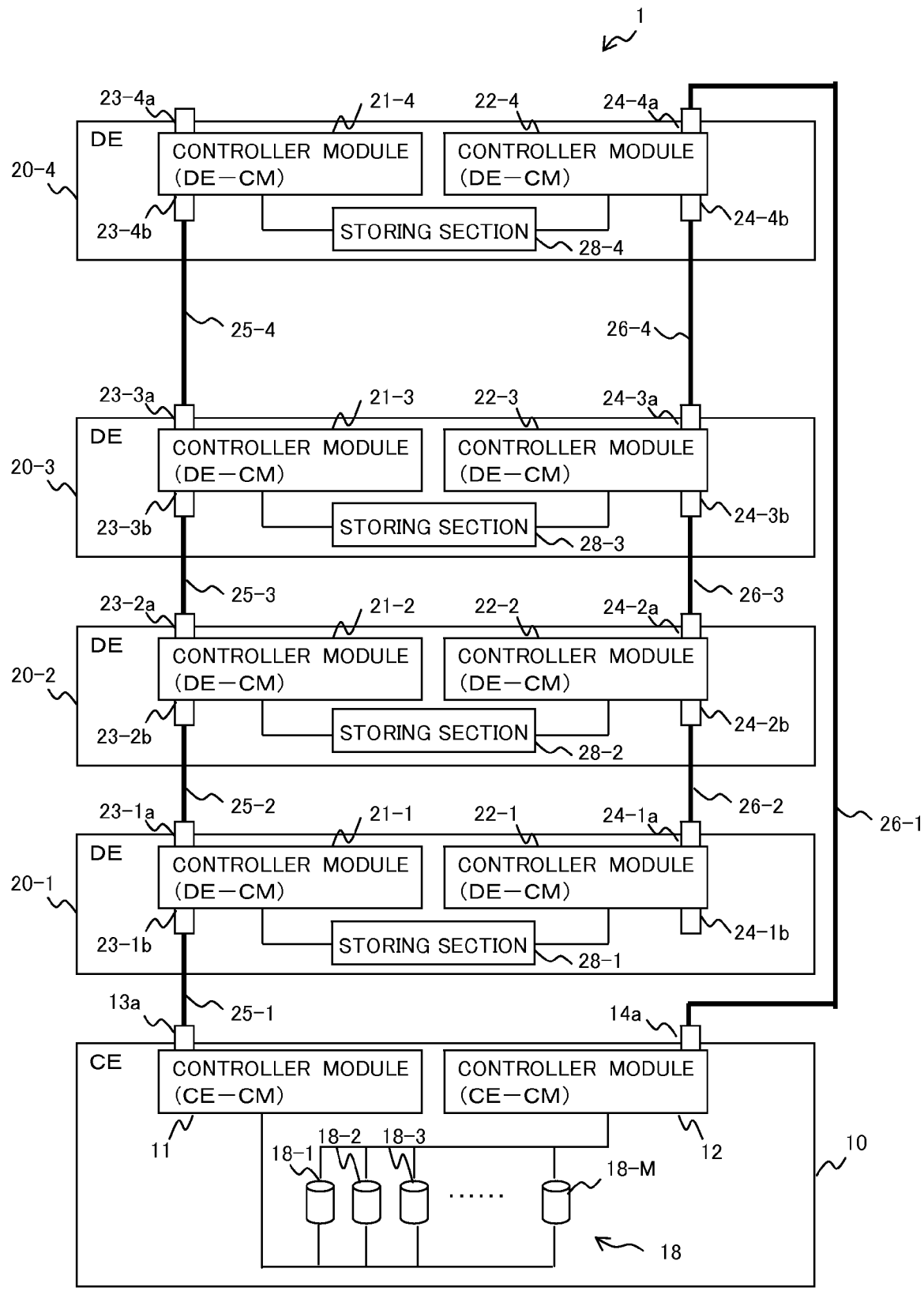
[FIG. 9] A diagram illustrating a procedure of adding a DE into the storage device of FIG. 1 and illustrating an example of the configuration of the storage device after the addition of the DE.

FIG. 9 is a diagram schematically illustrating the procedure to add a DE 20-4 into the storage device 1 of FIG. 1 and concurrently an example of the configuration after the addition of the DE 20-4.

In the drawing, reference numbers already mentioned represents the same or substantially same parts and elements, so detailed description thereof is omitted here. The added DE 20-4 is the same in configuration and in function as the DEs 20-1 through 20-3 , so detailed description is omitted here.

Here, cables 25-4 and 26-4 in FIG. 9 are added into the configuration of FIG. 1.

Firstly, the cable 26-1, which couples the PHY 14a of the CE-CM 12 with the PHY 24-3a of the DE-CM 20-3 on the second route, is disconnected from the PHY 24-3a, and is then coupled to the PHY 24-4a of the DE-CM 22-4 of the DE 20-4 that is to be added. This disconnection and coupling vary the coupling configuration of the second route, and in the CE 10 and the DEs 20, the CE-CM 12 and DE-CMs 22 create or update the respective route tables.

Next, on the second route, the additional cable 26-4 couples the PHY 24-3a of the DE-CM 22-3 with the PHY 24-4b of the DE-CM 22-4. This coupling varies the coupling configuration of the second route, and in the CE 10 and the DEs 20, the CE-CM 12 and DE-CMs 22 update the respective route tables.

Also on the first route, the additional cable 25-4 couples the PHY 23-3a of the DE-CM 21-3 with the PHY 23-4b of the DE-CM 21-4. This coupling varies the coupling configuration of the first route, and in the CE 10 and the DEs 20, the CE-CM 11 and DE-CMs 21 create or update the respective route tables.

The above procedure accomplishes the addition of the DE 20-4.

The coupling of the PHY 23-3a with the PHY 23-4b via the cable 25-4 can be carried out at any time point during the procedure. For example, the coupling may take place before the cable 26-4 couples the PHY 24-3a with the PHY 24-4b.

As the above, another DE is added into the storage device 1 of the first embodiment through at least two following steps (S1) and (S2).

(S1) serially coupling one of the two DE-CMs 21-4 and 22-4 of the DE 20-4 that is to be added with the last DE 20-3 on the first route; and (S2) interposing the other of the two DE-CMs 21-4 and 22-4 of the DE 20-4 that is to be added between the CE-CM 12 and the first DE-CM 22-3 on the second route such that the CE-CM 12, the DE-CM 22-4, and the DE-CM 22-3 are sequentially coupled.

As a consequence, the storage device can add a DE to the device without halting the system through the use of hot-swapping scheme. In other words, even during addition of a DE into the storage device 1, the operation of the device 1 can be continued. Specifically, even during the addition of a DE, since serial coupling from the CE-CM 11 through the DE-CM 21-3 on the first route is maintained, the storage device 1 continues to be capable of accessing the storing sections 28-1 through 28-3 of the DE 20-1 through 20-3.

When the DE-20-4 is to be removed, it is satisfactory that the cables are coupled and disconnected in the inverse order of the above procedure.

(B) Second Embodiment:

(B-1) Configuration of the Second Embodiment:

The storage device 1 of the first embodiment adopts SAS, which does not permit discs and enclosures to be coupled into a loop. However, a storage device 1' can have a configuration of a loop-shape coupling through logically creating route tables by loop detectors 114 and 124 and loop selector 115 and 125 included in the CE-CMs 11' and 12'. Hereinafter, the configuration of the storage device 1' of the second embodiment will be detailed.

Figure 10:
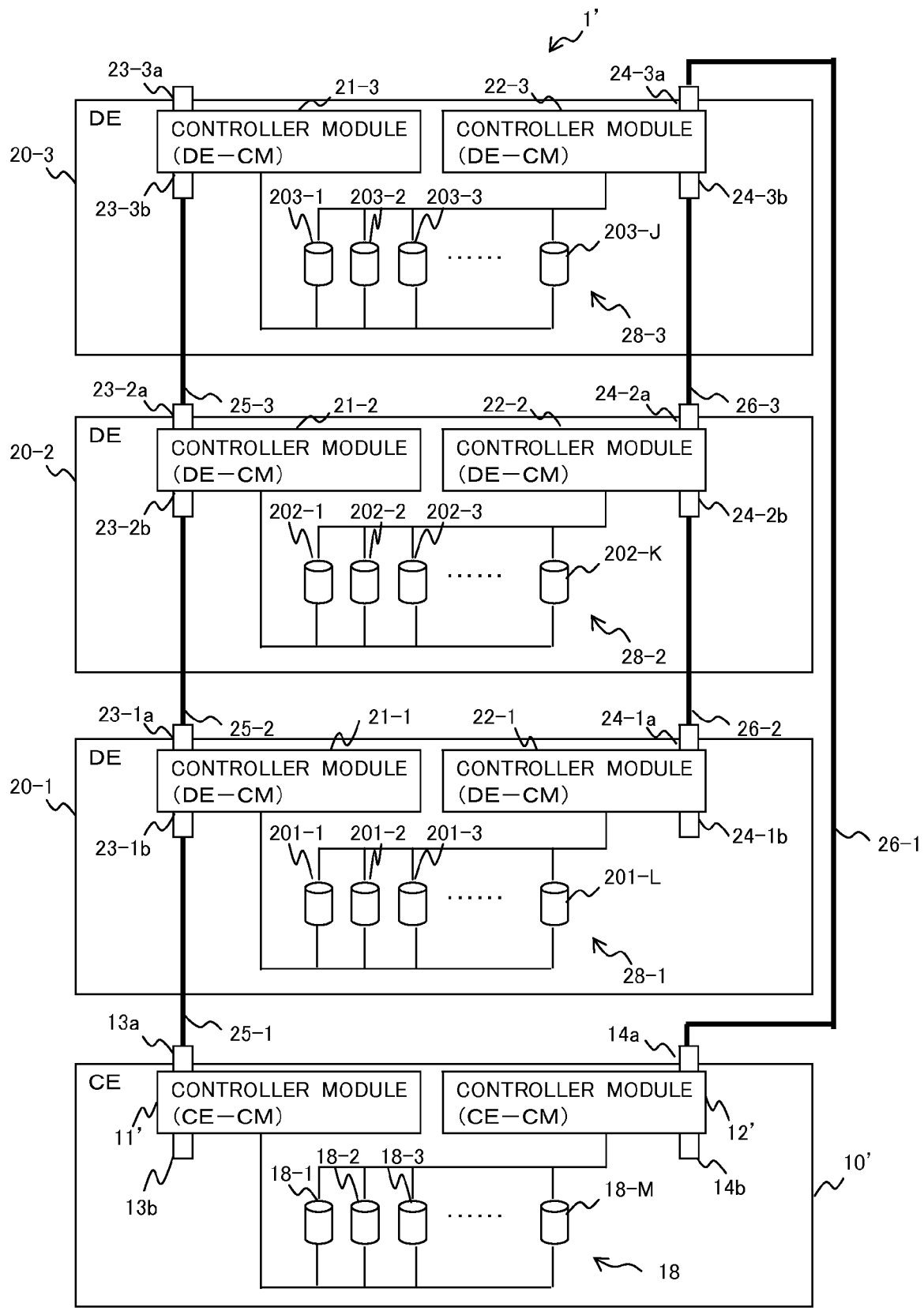
[FIG. 10] A diagram schematically illustrating an example of the configuration of a storage device according to a second embodiment.
Figure 11:
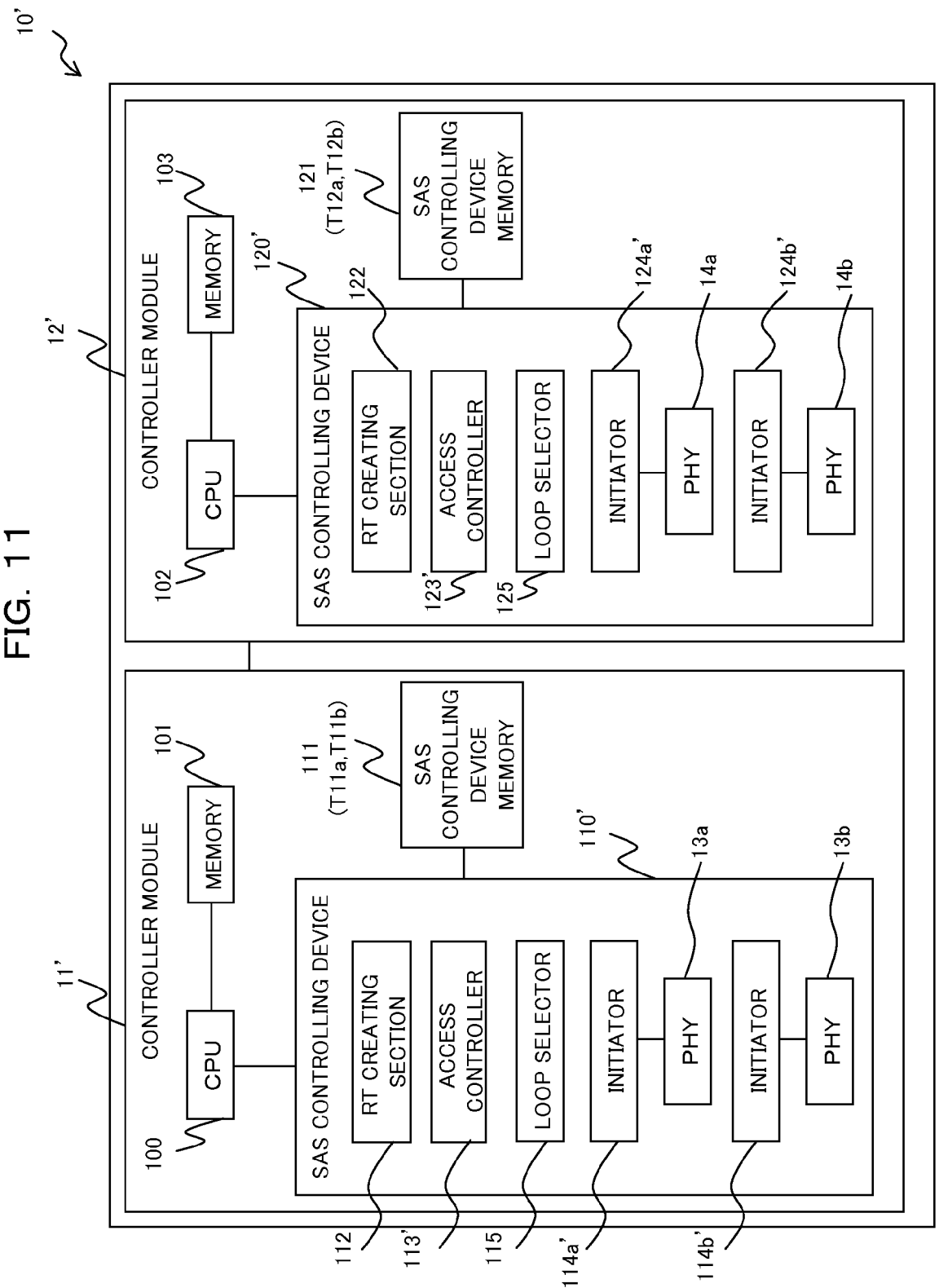
[FIG. 11] A block diagram illustrating an example of the configuration of the CE of the second embodiment.

FIG. 10 is a diagram schematically illustrating an example of the configuration of the storage device 1' according to the second embodiment. FIG. 11 is a block diagram schematically illustrating an example of the configuration of the CE 10' of the storage device 1' of the second embodiment.

In the drawing, reference numbers already mentioned represents the same or substantially same parts and elements, so detailed description thereof is omitted here.

As illustrated in FIG. 10, the storage device 1' of the second embodiment is the same in configuration as the storage device 1 of the first embodiment except for the replacement of the CE 10 of the first embodiment with the CE 10', which includes, as substitutes for the CE-CMs 11 and 12 of the CE 10 of the first embodiment, CE-CMs 11' and 12' as illustrated in FIGS. 10 and 11. Furthermore, as illustrated in FIG. 11, the CE-CMs 11' and 12' include SAS controlling devices 110' and 120', respectively, as substitutes for the SAS controlling devices 110 and 120 of the first embodiment.

The SAS controlling device 110' includes an access controller 113' and an initiator 114a' as substitutes for the access controller 113 and the initiator 114a, respectively, and further includes an initiator 114b', a PHY 13b, and the loop selector 115. The SAS controlling device 120' includes an access controller 123' and an initiator 124a' as substitutes for the access controller 123 and the initiator 124a, respectively, and further includes an initiator 124b', a PHY 14b, and the loop selector 125.

The CE-CMs 11 and 12 of the first embodiment each include the PHY 13a and the PHY 14a, respectively. In contrast, the CE-CMs 11' and 12' of the second embodiment each include two PHYs 13a and 13b, and two PHYs 14a and 14b, respectively. Here, the PHYs 13b and 14b are vacant in the configuration example illustrated in FIG. 10.

The initiators 114a' and 114b' of the SAS controlling device 110' have the same function as that of the initiator 114a of the first embodiment, and additionally detect whether the first route is coupled into a loop during a procedure of adding another DE in the second embodiment that is to be detailed below. Likewise, the initiators 124a' and 124b' of the SAS controlling device 120' have the same function as that of the initiator 124a of the first embodiment, and additionally detect whether the second route is coupled into a loop during a procedure of adding another DE in the second embodiment that is to be detailed below.

Hereinafter, the initiators 114a', 114b', 124a', and 124b' are sometimes called loop detectors 114a', 114b', 124a', and 124b', respectively. Furthermore, the initiators 114a' and 114b' are sometimes collectively called a loop detector 114; and the initiators 124a' and 124b' are sometimes collectively called a loop detector 124.

In creation of route tables by the respective route table creating sections 112 and 122, the loop detectors 114 and 124 determine that the first route or the second route is coupled into a loop, that is, the first route or the second route is in a loop form, when the following (1) and/or (2) are detected:

(1) The SAS address of the device appears in the route tables of the same device. In other words, information on the CE-CMs 11' or 12' appears in the route tables T11a, T11b, T12a, and T12b;

(2) Creation of the route tables T11a, T11b, T12a, and T12b is not finished after a predetermined time period from the start of the creation.

When the loop detector 114 detects the presence of a loop, the loop selector 115 selects one from the two circumferential directions of the loop, and creates a route table, assuming that the DEs 20 are coupled with one another along the selected direction. Specifically, the loop selector 115 selects one from the initiator 114a' to access discs in the order of addition of the DEs and the initiator 114b' to access discs in the reverse order of the addition, and invalidates the other initiator unselected. The invalidation causes the route table creating sections 112 and 212 in the storage device 1' not to recognize the other PHY (i.e., one associated with the invalidated initiator). Namely, the first route is physically coupled into a loop, but can logically be regarded to be serially coupled. Accordingly, the route table creating sections 112 and 212 create route tables representing an access route along the direction that the DE-CM 21 is accessed from the one PHY (i.e., one associated with the selected initiator).

For example, assuming that the loop selector 115 selects the initiator 114a', but invalidates the initiator 114b', the route table creating section 112 does not recognize the PHY 13b that is associated with the unselected initiator 114b'. Accordingly, a route table storing SAS address of the SAS devices starting from the PHY 13a of the CE-CM 11' in the order of the addition, and consequently, the first route is determined along the order of the addition.

The loop selector 125 functions the same as the loop selector 115. Specifically, when the loop detector 124 detects the presence of a loop, the loop selector 125 selects one from the initiator 124b' to access discs in the order of the addition and the initiator 124a' to access discs in the reverse order of the addition, and invalidates the other initiator unselected.

In order to invalidate such unselected initiators as the above, the loop selectors 115 and 125 can use valid/invalid flags, which can take a form of a table associated with the respective initiators 114a', 114b', 124a', and 124b'. The table can be stored in the SAS controlling device memories 111 and 121. Alternatively, the validity/invalidity of each of the initiators 114a', 114b', 124a', and 124b' can be managed through the use of one of the functions of SAS. This validity/invalidity management can be realized in any known method and the detailed description thereof is omitted here.

When the loop detector 114 or 124 detects the presence of a loop, the loop selector 115 or 125 selects one from the two circumferential directions of the loop, and validates the one initiator associated with the selected direction while invalidating the other initiator associated with the unselected direction. In this case, the route table creating sections 112, 212, 122, and 222 create the respective route tables based on the validity/invalidity.

When the SAS controlling devices 110' or 120' detect variation in coupling configuration of the storage device 1', the loop selector 115 or 125 deletes (clears) the validity/invalidity information associated with the initiator 114a' and 114b', or the initiators 124a' and 124b'. When the loop detector 114 or 124 detects another loop, the loop selector 115 or 125 again selects one from the two circumferential directions of the loop, and validates the one initiator associated with the selected direction while invalidates the other initiator associated with the unselected direction.

Here, in selecting initiators to determine the respective access routes by the loop selectors 115 and 125, whether the loop selectors 115 and 125 select initiators associated with the order of the addition of DEs or initiator associated with the reverse order of the addition of the DE can be freely determined at any arbitrary time point, for example, when the CE 10 is designed or is put into practice. In other words, the loop selectors 115 and 125 may select initiators such that the first route and the second route are in the reverse orders of each other or may select initiators such that the first route and the second route are in the same order. Furthermore, information to select initiators which information is determined in the above manner may be stored in the SAS controlling device memory 111 or 121.

As described in the above first embodiment, the configuration in which the first route is the reverse order of the second route makes the CE-CMs 11' and 12' possible to access, evens failure occurs in one of the DEs in the storage device 1', the storing sections of the DEs except for the failure DE. Accordingly, it is more preferable that the loop selectors 115 and 125 select initiators such that the first route is the reverse order of the second route.

The access controllers 113' and 123' are same in configuration and in function as the access controllers 113 and 123 of the first embodiment, respectively. When the access controller 113' and 123' detects that the first or the second route are in loop forms, the access controller 113' and 123' control access to the storing sections with reference to the route tables created as the above by the loop selectors 115 and 125, and the route table creating sections 112, 122, 212, and 222. The access controller 113' has a function of controlling access routes varied with the storing section to be accessed on the basis of the route tables T11a and T11b respectively associated with the PHYs 13a and 13b included in the CE-CM 11' which tables are created by the route table creating section 112 in the event of failure of one of the DE in the storage device 1' to be detailed below with reference to FIGS. 14 through 16. The access controller 123' likewise has a function of controlling access routes varied with the storing section to be accessed on the basis of the route tables T12a and T12b respectively associated with the PHYs 14a and 14b included in the CE-CM 12' which tables are created by the route table creating section 122 in the event of failure of one of the DE in the storage device 1' to be detailed below with reference to FIGS. 14 through 16.

Here, description will be now made in relation to the reasons for providing the loop detectors 114 and 124, and the loop selectors 115 and 125. The storage device 1' of the second embodiment adopts the SAS the same as the first embodiment. However, SAS does not permit enclosures to be coupled into a loop. In addition, even if enclosures are coupled into a loop, the route tables created by the route table creating sections 112, 122, 212, and 222 store the SAS addresses of the devices, and the creation of the route tables never terminates.

The storage device 1' of the second embodiment is configured to include the loop detector 114 and the loop selector 115 in the SAS controlling device 110' of the CE-CM 11' and to include the loop detector 124 and loop selector 125 in the SAS controlling device 120' of the CE-CM 12'. With this configuration, even when the first or the second route is temporarily coupled into the loop, the route table creating sections 112, 212, 122, and 222 create route tables representing the orders determined by the loop selectors 115 and 125 because the loop selectors 115 and 125 designate directions along which the route tables are to be created, invalidating the unselected initiators. This solves the conventional problems that the route tables created by the route table creating sections 112, 122, 212, and 222 store the SAS addresses of the devices and that the creation of the route tables never terminates.

In the configuration of the storage device 1' illustrated in FIGS. 10 and 11, when a failure occurs in one of the DEs, the storage device 1' functions the same as the storage device 1 of the first embodiment, so detailed description is omitted here.

Figure 12:
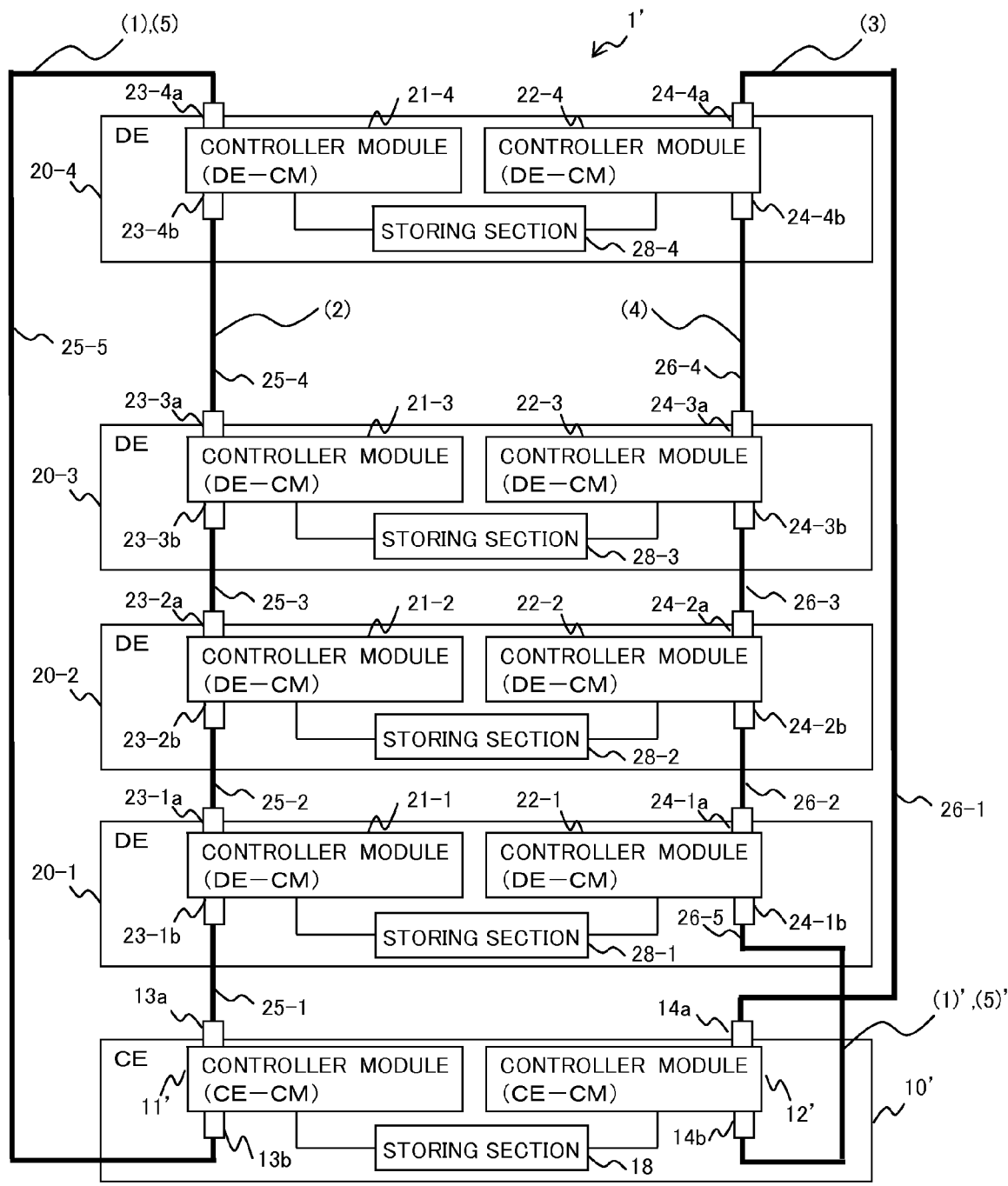
[FIG. 12] A diagram illustrating a procedure of adding a DE into the storage device of FIG. 10 and illustrating an example of the configuration of the storage device during the addition of the DE.

(B-2) Method of Adding Another DE in the Second Embodiment:

FIG. 12 is a diagram schematically illustrating the procedure to add a DE 20-4 into the storage device 1' of FIG. 10 and concurrently an example of the configuration during the addition of the DE 20-4.

Figure 13:
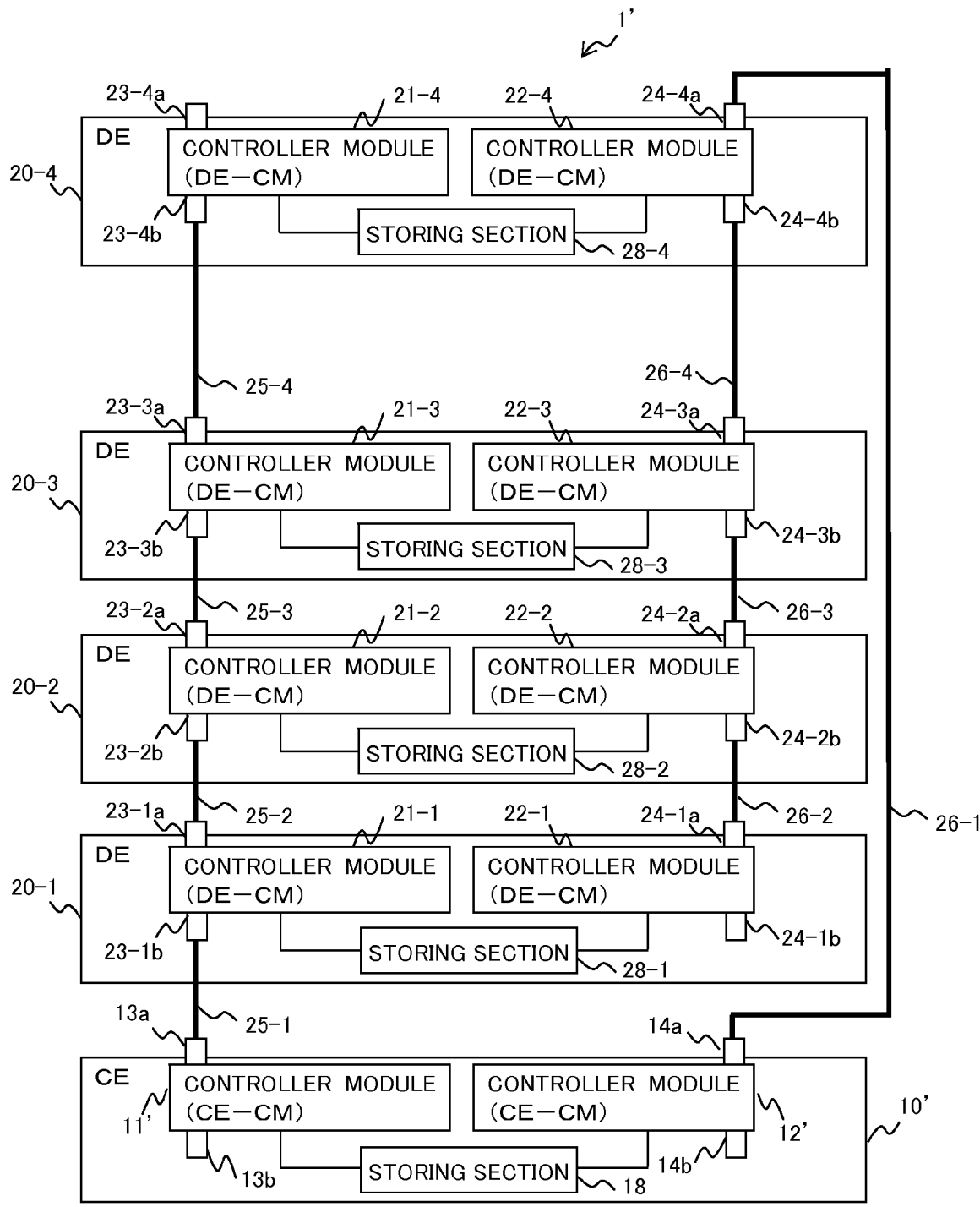
[FIG. 13] A diagram illustrating an example of the configuration of the storage device after the addition of the DE through the procedure of FIG. 12.

FIG. 13 is a diagram illustrating an example of the configuration after the addition of the DE 20-4 through the procedure of FIG. 12.

In the drawings, reference numbers already mentioned represents the same or substantially same parts and elements, so detailed description thereof is omitted here.

Hereinafter, description will now be made in relation to a method of adding another DE in the second embodiment with reference to FIGS. 12 and 13.

Here, cables 25-4, 25-5, 26-4, and 26-5 in FIG. 12 are added to the above-described configuration of FIG. 10. The numbers in the bracket attached to these cables represent the order of coupling when adding the DE 20-4 into the storage device 1'. Hereinafter, the addition of a DE is detailed in the order of the numbers in the bracket.

First, on the first route, the cable 25-5, which is used only for addition, couples the vacant port PHY 13b of the CE-CM 11' with the PHY 23-4a of the DE-CM 21-4 (step (1)). Also on the second route, the cable 26-5, which is used only for addition, couples the vacant port PHY 14b of the CE-CM 12' with the PHY 24-1b of the DE-CM 22-1 (step (1)'). Since this couplings vary the coupling configuration of both the first and the second routes, the CE-CMs 11' and 12' in the CE 10' and the DE-CMs 21 and 22 in the DEs 20 create or update the respective route tables. In addition, the second route is coupled into a loop. Accordingly, in creating the route tables concerning the second route, the loop detector 124 of the CE-CM 12' detects the presence of the loop and the loop selector 125 selects one of the initiators 124a' and 124b' (invalidating the other initiator that is unselected).

Next, on the first route, the additional cable 25-4 couples the PHY 23-3a of the DE-CM 21-3 with the PHY 23-4b of the DE-CM 21-4 (step (2)). Since the coupling varies the coupling configuration of the first route, the CE-CM 11' in the CE 10' and DE-CMs 21 in the DEs 20 update the respective route tables. In addition, the first route is coupled into a loop. Accordingly, the loop detector 114 of the CE-CM 11' detects the presence of the loop, and the loop selector 115 selects one of the initiators 114a' and 114b' (invalidating the other initiator unselected).

On the second route, the cable 26-1, which is coupling the PHY 14a of the CE-CM 12' with the PHY 24-3a of the DE-CM 20-3, is disconnected from the PHY 24-3a of the DE-CM 22-3, and is coupled to the PHY 24-4a of the DE-CM 22-4 included in the DE 20-4 that is to be added (step (3)). Since this disconnection and coupling vary the coupling configuration of the second route, CE-CM 12' in the CE 10' and the DE-CMs 22 in the DEs 20 create or update the respective route tables.

Furthermore, on the second route, the additional cable 26-4 couples the PHY 24-3a of the DE-CM 22-3 with the PHY 24-4b of the DE-CM 22-4 (step (4)). Since this coupling varies the coupling configuration of the second route, the CE-CM 12' in the CE 10' and the DE-CMs 22 in the DEs 20 update the respective route tables. In addition, the second route is coupled into a loop. Accordingly, on the second route, the loop detector 124 of the CE-CM 12' detects the presence of the loop, and the loop selector 125 selects one of the initiators 124a' and 124b' (invalidating the other initiator unselected).

For the last, on the first route, the cable 25-5, which is used only for adding a DE, is disconnected from the PHY 13b of the CE-CM 11' and PHY 23-4a of the DE-CM 21-4 (step (5)). Likewise on the second route, the cable 26-5, which is used only for adding a DE, is disconnected from the PHY 14b of the CE-CM 12' and PHY 23-1b of the DE-CM 22-1 (step (5)').

The addition of the DE 20-4 to the storage device 1' is completed through the above procedural steps, as illustrated in FIG. 13. In the storage device 1' in the second embodiment, a DE is added through at least the following four steps (S11) through (S14):

(S11) serially coupling, in sequence, the CE-CM 11', one of the two DE-CMs 21-4 and 22-4 of a DE 20-4 that is to be added, and the DE-CM 21-3 disposed at the last on the first route, so that the first route is formed into a loop (steps (1) and (2));

(S12) coupling the DE-CM 12' with the DE-CM 22-1 disposed at the last on the second route, so that the second route is formed into a loop (step (1)');

(S13) after forming the second route into the loop, interposing the other of the two DE-CMs 21-4 and 22-4 of the DE 20-4 to be added between the DE-CM 12' on the second route and the DE-CM 22-3 disposed the first on the second route so that the CE-CM 12', the other DE-CM 22-4, and the DE-CM 22-3 are serially coupled (steps (3) and (4)); and (S14) after serially coupling the DE-CM 22-4, the other CM 21-4 of the DE 20-4 that is to be added, disconnecting the DE-CM 21-4, the one CM of the DE 20-4 that is to be added, from the CE-CM 11' on the first route, and concurrently disconnecting the CE-CM 12' on the second route from the DE-CM 22-1 disposed at the last on the second route (steps (5), (5)').

As a consequence, the storage device 1' can add a DE without halting the system through the use of hot-swapping scheme. In other words, even during addition of a DE to the storage device 1', the operation of the device 1' can be continued. Specifically, even during the addition of a DE, since the first route serially connects from the CE-CM 11 through the DE-CM 21-4, the storage device 1' continues to be capable of accessing the storing sections 28-1 through 28-3 of the DE 20-1 through 20-3.

The procedure of adding a DE (i.e., the order of coupling cables) are not limited to the above as long as the procedure includes the steps (S11) through (S14).

For example, the order of the step (1) of coupling via the cable 25-5 and the step (1)' of coupling via the cable 26-5 can be interchangeable. The order to the step (5) of disconnecting from the cable 25-5 and the step (5)' of disconnecting from the cable 26-5 can also be interchangeable.

The addition of the DE 20-4 in the above procedure causes at least one of the first route and the second route to take a form of a loop always during steps (S11) through (S13). At that time, the loop selector 115 and 125 and route table creating sections 112 and 122 preferably create route tables such that the first route is the reverse order of the second route.

In the storage device 1' adopting SAS of the second embodiment, even if the access routes (the first and the second routes) are formed into loops during addition of a DE, route tables can be created with the aid of the loop detectors 114 and 124 and the route table creating sections 112, 122, 212, and 222. Accordingly, all the storing sections (discs) in the storage device 1' are accessible.

With this configuration, even when a failure occurs in one of the DEs in the storage device 1', the CE-CMs 11' and 12' can access all the DEs except for the failure DE through selectively using the first route and the second route. In other words, the presence of the two access routes (i.e., the first route and the second route) makes the storage device 1' possible to always keep redundancy even during addition of a DE, ensuring high reliability of the storage device 1' even during the addition.

When the DE-20-4 is to be removed, it is satisfactory that the cables are coupled and disconnected in the reverse order of the above procedure.

(B-3) Operation of the Storage Device When a Failure Occurs in One of the DES During the Addition of a DE (i.e., when an Access Route Comes to be a Loop) in the Second Embodiment:

Hereinafter, description will now be made in relation to the operation of the storage device 1' which has a loop access route when a failure of one of the DEs develops failure with reference to FIGS. 14 through 16.

Figure 14:
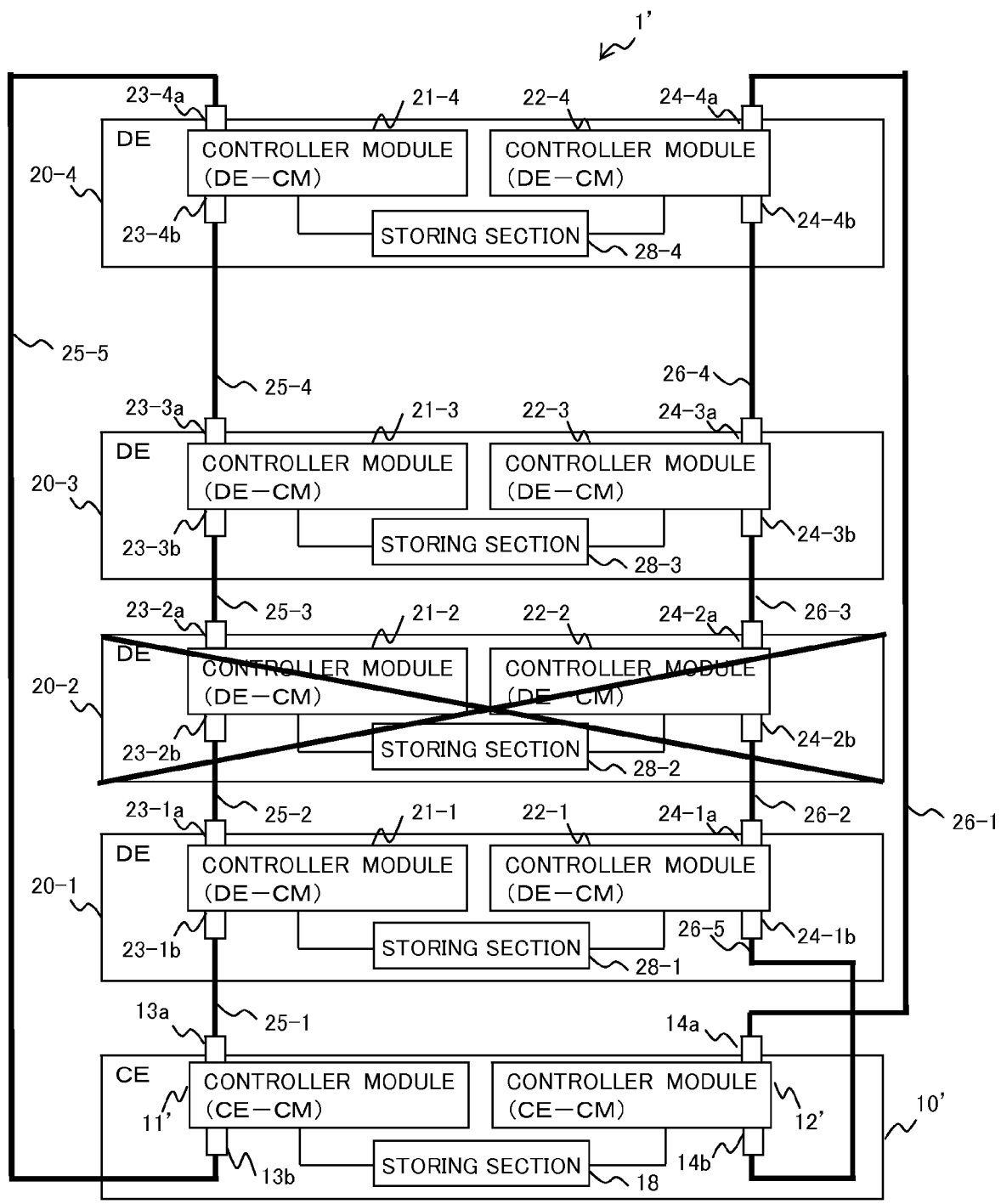
[FIG. 14] A diagram illustrating an example of the configuration of the storage device of FIG. 12 when a failure occurs in one of the DEs during the addition of the DE.

FIG. 14 is a diagram illustrating an example of the configuration of the storage device 1' of FIG. 12 when a failure occurs in one of the DEs during the addition of a DE.

FIG. 15 is a diagram illustrating SAS addresses stored in route tables T11a, T11b, and T21 possessed in the CE-CM 11' and DE-CMs 21 on the first route in the configuration of FIG. 14 in which a failure occurs in the DE 20-2.

FIG. 16 is a diagram illustrating SAS addresses stored in route tables T12a, T12b, and T22 possessed in the CE-CM 12' and DE-CMs 22 on the second route in the configuration of FIG. 14 in which a failure occurs in the DE 20-2.

As illustrated in FIG. 14, a failure occurs in the DE 20-2, the SAS controlling devices 110', 120', 210-1, 220-1, 210-3, 220-3, 210-4, and 220-4 included in the CE 10', the DE 20-1, the DE 20-3, and the DE 20-4 detect a variation in the coupling configuration of the SAS devices. The loop selector 115 and 125 delete (clear) "invalid" information set for the initiator 114a' or 114b' and the initiator 124a' or 124b' before the failure of the DE 20-2, that is, while both the first route and the second route are coupled into loops. The route table creating sections 112, 122, 212-1, 222-1, 212-3, 222-3, 212-4, and 222-4 update the respective route tables T11a, T11b, T12a, T12*b*, T21, and T22 storing SAS addresses of SAS device currently accessible in a known method.

As a consequence, the PHYs 13, 14, 23, and 24 of the CE 10' and the DEs 20 are associated with the route tables T11*a*, T11*b*, T12*a*, T12*b*, T21, T22 storing SAS addresses of all the SAS devices that can be referred by the respective PHYs 13, 14, 23, and 24, as illustrated in FIGS. 15 and 16.

As illustrated in FIGS. 15 and 16, no route table is created in association with the PHYs 23-2*a*, 23-2*b*, 24-2*a*, and 24-2*b* of the failure DE 20-2. Besides, the specification of SAS creates no route table in association with the PHYs 23-1b and 24-1*b* of the DE 20-1, the PHYs 23-3*a* and 24-3*a* of the DE 20-3, and the PHYs 23-4*a* and 24-4*a* of the DE 20-4. Furthermore, since the PHYs 23-1*a* and 24-1*a* of the DE 20-1 and the PHYs 23-3*b* and 24-3*b* of the DE 20-3 are coupled to the failure of DE 20-2, there is no accessible SAS device, the respective route table stores no address of accessible SAS address.

The access controller 113' of the CE-CM 11' obtains SAS address of "all the discs in the storing section 28-1" described in the columns associated with the PHY number "PHY 13*a*" on the first route of FIG. 15 from the created route table T11*a*. The access controller 113' obtains SAS address of "all the discs in the storing section 28-3" and "all the discs in the storing section 28-4" described in the columns associated with the PHY number "PHY 13*b*" from the created route table T11*b*.

Until the route tables are updated next, in the event of a request for access to one of the discs included in the storing section 28-1, the access controller 113' instructs the initiator 114*a*' associated with the PHY 13*a* to access the disc requested. Meanwhile, when a request for access to one of the discs included in the storing section 28-3 or 28-4, the access controller 113' instructs the initiator 114*b*' associated with the PHY 13*b* to access the disc requested.

In the same manner, the access controller 123' of the CE-CM 12' obtains SAS address of "all the discs in the storing section 28-3" and "all the discs in the storing section 28-4" from the columns associated with the PHY number "PHY 14*a*" on the second route of FIG. 16 from the created route table T12*a*. Furthermore, the access controller 123' obtains SAS address of "all the discs in the storing section 28-1" from the columns associated with the PHY number "PHY 14*b*" from the created route table T12*b*. Until the route tables are updated next, in the event of a request for access to one of the discs included in the storing section 28-1, the access controller 123' instructs the initiator 124*b*' associated with the PHY 14*b* to access the disc requested. Meanwhile, when a request for access to one of the discs included in the storing section 28-3 or 28-4, the access controller 123' instructs the initiator 124*a*' associated with the PHY 14*a* to access the disc requested.

In this case, both the CE-CMs 11' and 12' can access all the discs included in the storing sections 28-1, 28-3, and 28-4.

Here, as explained also in the first embodiment, the access controllers 113' and 123' determine the first route or the second route to be the access route according to predetermined conditions. Otherwise, the access controllers 113' and 123' may determine one of the first and the second routes to be the access route at any arbitrary time point, for example, when the CE 10' is designed or is put into practice.

As the above, the CE-CMs 11' and 12' causes the access controllers 113' and 123' to determine the access route that can access to a disc to be accessed on the basis of the route tables T11*a* and T11*b*, or T12*a* and T12*b* respectively stored in the route table storing sections 111 and 121. The access controller 113' or 123' instructs the initiator 114*a*' 114*b*', 124*a*', or 124*b*' associated with the determined access route to carry out processing on the disc to be accessed.

For example, when the host device issues a read request for the disc 201-2 of the storing section 28-1 of the DE 20-1 to the CE 10', the access controllers 113' and 123' refer to the route tables T11*a*, T11*b*, T12*a*, and T12*b* stored in the respective route table storing sections 111 and 121. The access controller 113' consequently finds the SAS address of the disc 201-2 of the storing section 28-1 in the route table T11*a* associated with the PHY 13*a* in FIG. 15 while the access controller 123' consequently finds the SAS address of the disc 201-2 of the storing section 28-1 in the route table 12*b* associated with the PHY 14*b* in FIG. 16. As the above, when either CE-CMs 11' and 12' can access disc 201-2 of the storing section 28-1, either CE-CM 11' or 12' instructs the associated initiator 114*a*' or 124*b*' to access the disc 201-2 of the storing section 28-1.

When a failure occurred in the DE 20-2 develops a failure due to some reasons, the above configuration allows the CE-CM 11' of the CE 10' to access the DE-CM 21-1 of the DE 20-1 via the PHYs 13*a* and 23-1*b* through the first route, so that processing on the storing section 28-1 can be accomplished. In addition, the CE-CM 11' accesses the DE-CM 21-4 of the DE 20-4 from the PHYs 13*b* and 23-4*a*, so that processing on the storing section 28-4 can be accomplished.

Further, the CE-CM 11' accesses the DE-CM 21-3 of the DE 20-3 via, in sequence, the PHYs 13*b*, 23-4*a*, 23-4*b*, and 23-3*a*, so that processing on the storing section 28-3 can be accomplished.

Through the second route wired differently in route from the first route, the CE-CM 12' of the CE 10' accesses to the DE-CM 22-1 of the DE 20-1 via the PHY 14*b* and 24-1*b*, so that processing on the storing section 28-1 can be accomplished. Besides, the CE-CM 12' accesses the DE-CM 22-4 of the DE 20-4 via the PHYs 14*a* and 24-4*a*, so that processing on the storing section 28-4 can be accomplished. Furthermore, the CE-CM 12' accesses the DE-CM 22-3 of the DE 20-3 via, in sequence, the PHYs 14*a*, 24-4*a*, 24-4*b*, and 24-3*a* so that processing on the storing section 28-3 can be accomplished.

Accordingly, even when a failure occurs in the DE 20-2 of the storage device 1' having the loop-shaped routes illustrated in FIG. 14, selectively using between the first route and the second route on the basis of the route tables created after the failure by the route table creating sections 112 and 122 makes it possible to access the storing sections 28-1, 28-3, and 28-4 of the DE 20-1, 20-3, and 20-4, respectively.

As a result, even when a failure occurs in one of the DEs on the access route, the simple configuration of the storage device 1' of the second embodiment can access all the remaining DEs, i.e., DEs other than the failure DE, thereby minimizing the influence of the failure of the DE on the operation of the storage device.

In addition, the presence of the two access routes (i.e., the first route and the second route) makes the storage device 1' possible to always keep redundancy even during addition of a DE, ensuring high reliability of the storage device 1' even during the addition of a DE.

(C) Modification of Second Embodiment:

As described in the second embodiment, storage device 1' adopts SAS, which does not permit discs and enclosures to be coupled into a loop. However, the storage device 1' can have a configuration of a loop-shape coupling through logically creating route tables by the loop detectors 114 and 124 and the loop selector 115 and 125 included in the CE-CMs 11' and 12'.

Hereinafter, description will now be made in relation to a procedure of adding an DE into the storage device 1' of FIG. 10 according to this modification with reference to FIGS. 17 and 18.

Figure 17:
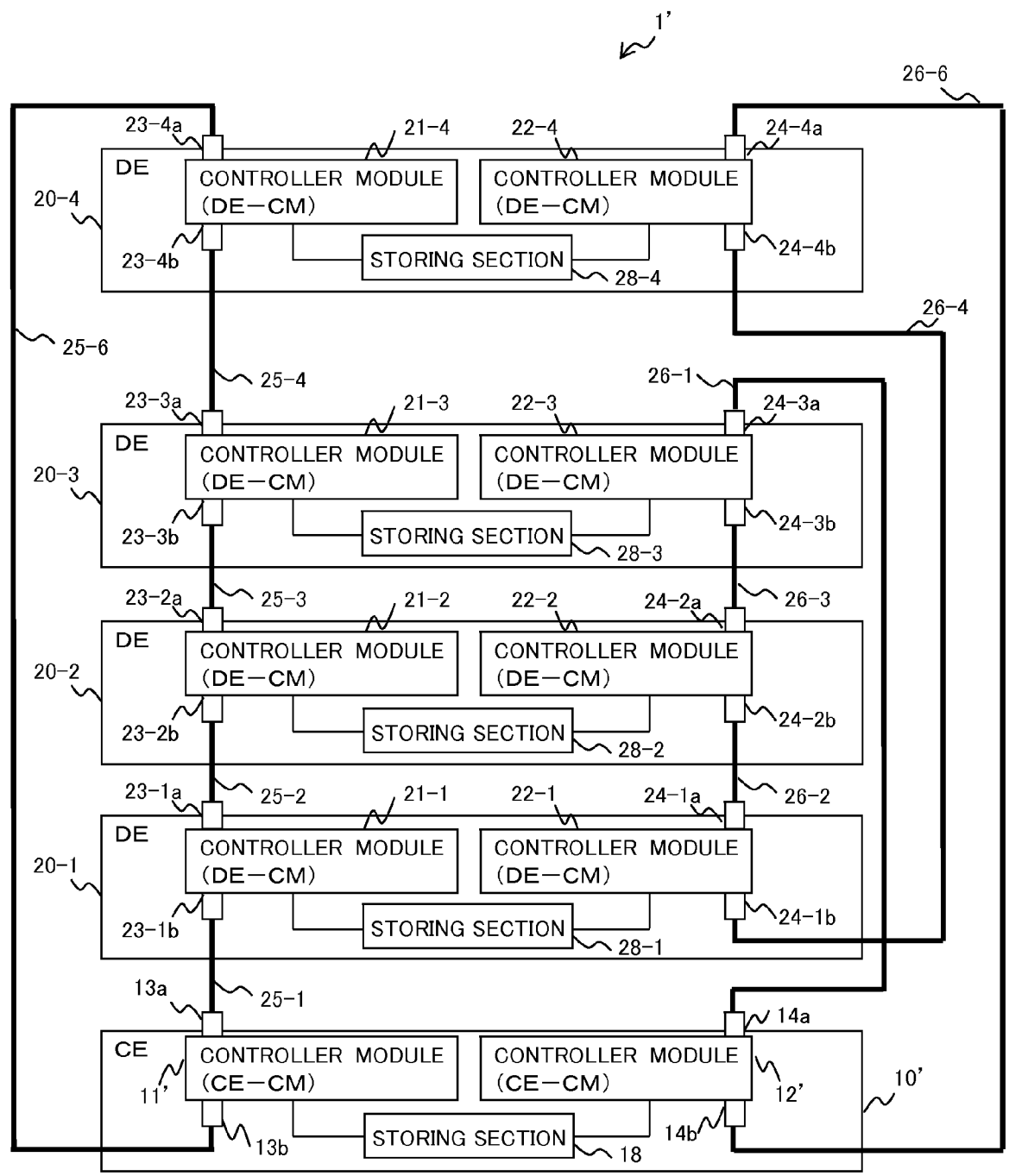
[FIG. 17] A diagram illustrating a modification of a procedure of adding a DE in the storage device of FIG. 10 and schematically illustrating an example of the configuration after the addition according to the modification.

FIG. 17 is a diagram schematically illustrating the procedure to add a DE 20-4 into the storage device 1' of FIG. 10 according to the modification and concurrently an example of the configuration during the addition of the DE 20-4 according to the modification.

In the drawings, reference numbers already mentioned represent the same or substantially same parts and elements, so detailed description thereof is omitted here.

Here, cables 25-4, 25-6, 26-4, and 26-6 in FIG. 17 are added to the above-described configuration of FIG. 10.

First, the additional cable 25-4 couples the PHY 23-3a of the DE-CM 21-3 with the PHY 23-4b of the DE-CM 21-4. Since this coupling varies the coupling configuration of the first route, the CE-CM 11' in the CE 10' and the DE-CMs 21 in the DEs 20 create or update the respective route tables.

Next, the additional cable 25-6 couples the PHY 13b of the CE-CM 11' with the PHY 23-4a of the DE-CM 21-4. Since this coupling varies the coupling configuration of the first route, the CE-CM 11' in the CE 10' and the DE-CMs 21 in the DEs 20 update the respective route tables. Consequently, the first route is coupled into a loop. Accordingly, on the first route, the loop detector 114 of the CE-CM 11' detects the presence of the loop and the loop selector 115 selects one of the initiators 114a' and 114b' (invalidating the other initiator that is unselected).

Furthermore, the additional cable 26-4 couples the PHY 24-1b of the DE-CM 22-1 with the PHY 24-4b of the DE-CM 22-4. since this coupling varies the coupling configuration of the second route, the CE-CM 12' in the CE 10' and the DE-CMs 22 in the DEs 20 create or update the respective route tables.

For the last, the additional cable 26-6 couples the PHY 14b of the CE-CM 12' with the PHY 24-4a of the DE-CM 22-4. Since this coupling varies the coupling configuration of the second route, the CE-CM 12 in the CE 10 and the DE-CMs 22 in the DEs 20 update the respective route tables. The second route is consequently coupled into a loop. Accordingly, on the second route, the loop detector 124 of the CE-CM 12' detects the presence of the loop and the loop selector 125 selects one of the initiators 124a' and 124b' (invalidating the other initiator that is unselected).

The addition of the DE 20-4 to the storage device 1' is completed through the above procedural steps.

As a consequence, the storage device 1' can add a DE without halting the system through the use of hot-swapping scheme, so that, even during addition of a DE into the storage device 1' the operation of the device 1' can be continued.

In the addition of a DE illustrated in FIG. 17, the wiring of the cables 25-1 through 25-3 and 26-1 through 26-3 in FIG. 10 is not changed and simply four additional cables 25-4, 25-6, 26-4, and 26-6 are added for the first and second routes. Advantageously, since the first route couples the enclosures in the reverse order of the second route while expanding the storage device 1', the storage device 1' can continue to access the storing sections 28-1 through 28-3 of the DEs 20-1 through 20-3, respectively even during the addition of a DE. In addition, this modification does not change the wiring already provided in the storage device 1' illustrated in FIG. 10, operation for the addition can be facilitated.

The order of coupling cables in the addition of a DE should by no means be limited to that described the above.

Figure 18:
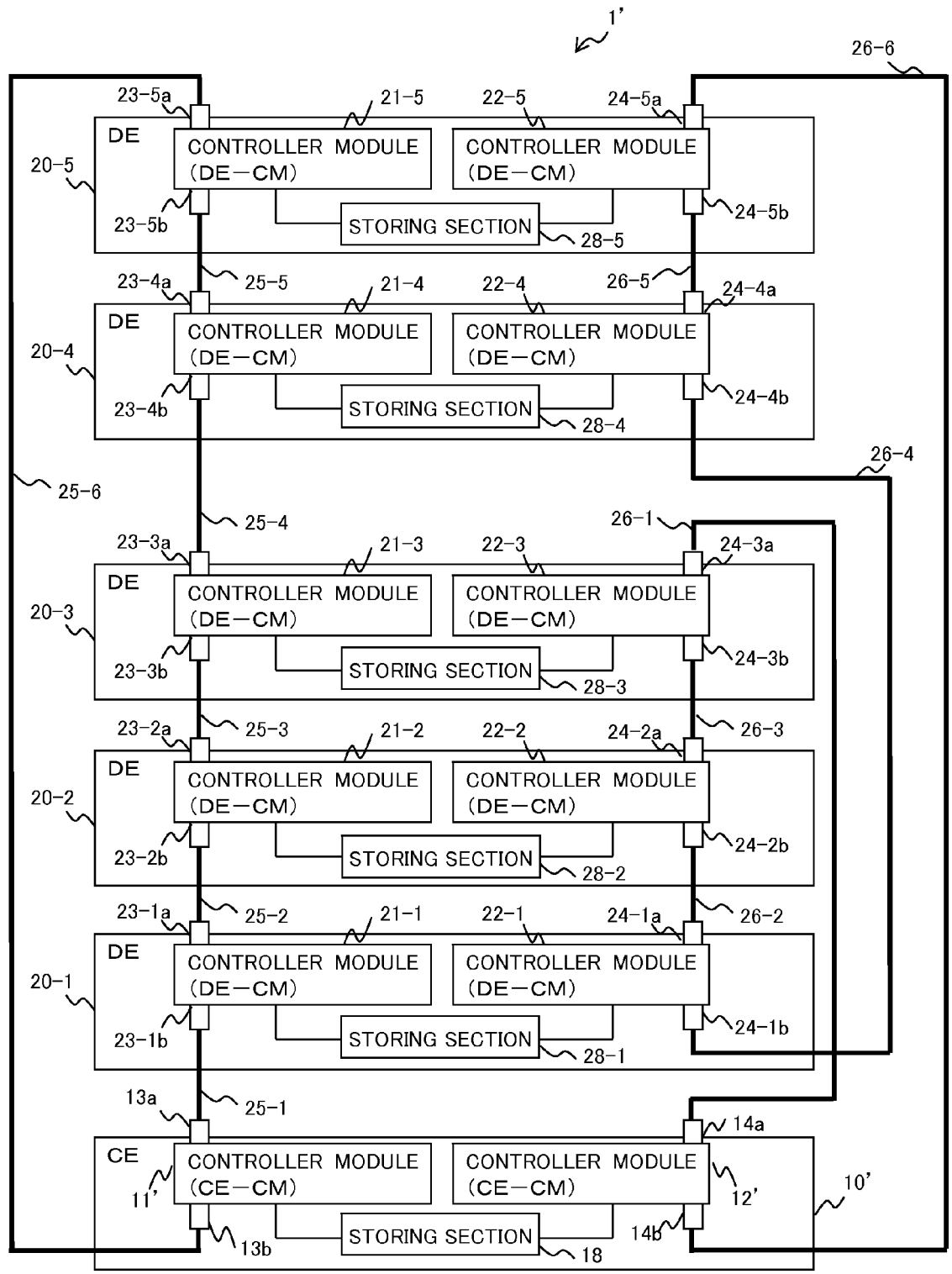
[FIG. 18] A diagram illustrating a procedure of adding a DE in the storage device of FIG. 17 and schematically illustrating an example of the configuration after the addition.
Figure 19:
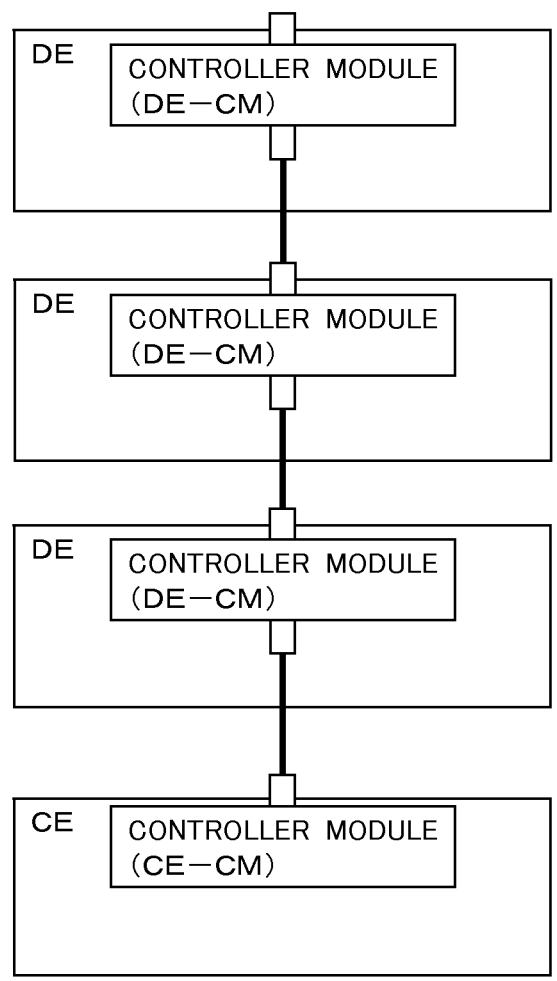
[FIG. 19] A diagram schematically illustrating an example of a state of adding a DE in a conventional storage device.
Figure 20:
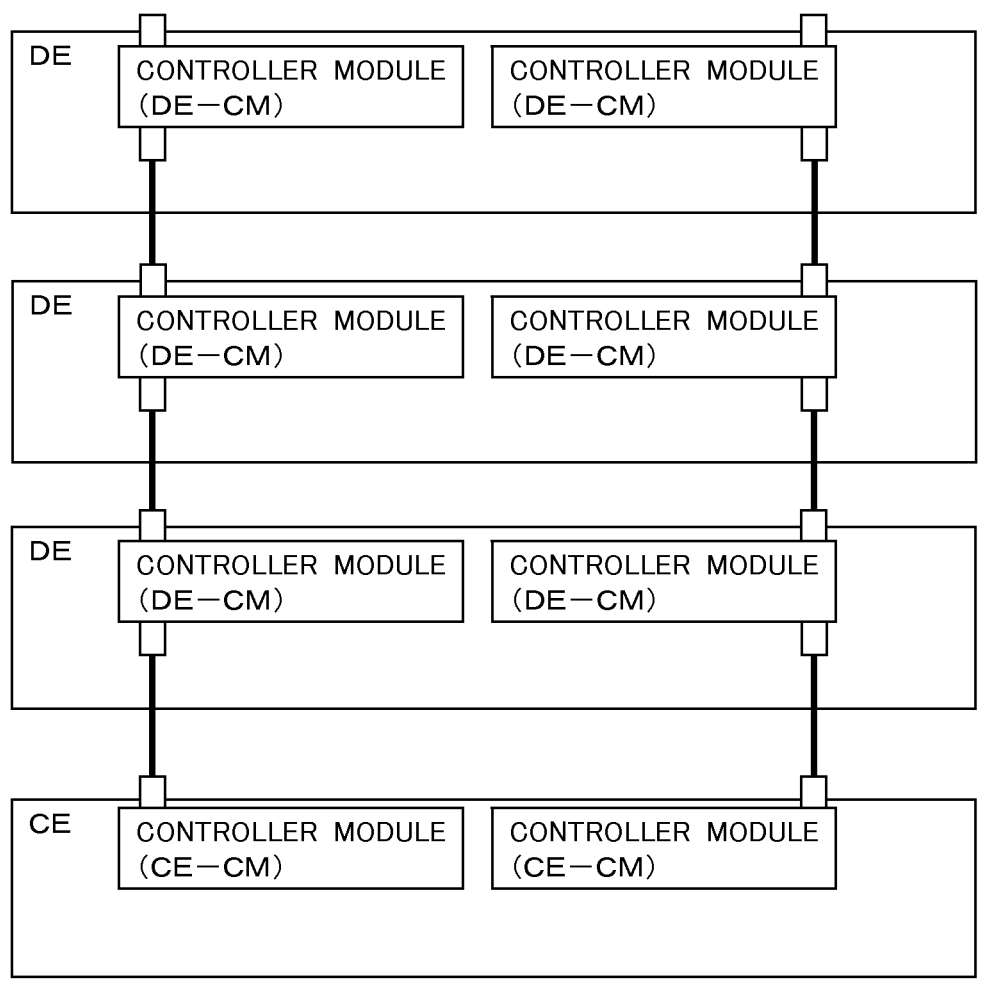
[FIG. 20] A diagram schematically illustrating another example of a state of adding a DE in a conventional storage device.

FIG. 18 is a diagram schematically illustrating a procedure of adding a DE 20-5 in the storage device of FIG. 17 and schematically illustrating an example of the configuration after the addition of the DE 20-5.

In the drawings, reference numbers already mentioned represents the same or substantially same parts and elements, so detailed description thereof is omitted here. The DE 20-5 to be added is the same in configuration and in function as the DEs 20-1 through 20-4, so repetitious description is omitted here.

Here, the cables 25-5 and 26-5 in FIG. 18 are added to the storage device 1' having the configuration illustrated in FIG. 17.

Firstly, on the first route, the cable 25-6, which is coupling the PHY 13b of the CE-CM 11' with the PHY 23-4a of the DE-CM 21-4, is disconnected from the PHY 23-4a of the DE-CM 21-4. Besides, on the second route, the cables 26-6, which is coupling the PHY 14b of the CE-CM 12' with the PHY 24-4a of the DE-CM 22-4, is disconnected from the PHY 24-4a of the DE-CM 22-4. These disconnections and couplings vary the coupling configuration of the first route and the second route. The CE-CMs 11' and 12' of the CE 10' and the DE-CMs 21 and 22 of the DEs 20 update the respective route tables.

Next, on the first route, the additional cable 25-5 couples the PHY 23-4a of the DE-CM 21-4 with the PHY 23-5b of the DE-CM 21-5 of the DE 20-5 that is to be added. Besides, on the second route, the additional cable 26-5 couples the PHY 24-4a of the DE-CM 22-4 with the PHY 24-5b of the DE-CM 22-5 of the DE 20-5. Since the couplings vary the coupling configurations of both the first route and the second route, the CE-CMs 11' and 12' of the CE 10' and the DE-CMs 21 and 22 of the DEs 20 create or update the respective route tables.

At last, on the first route, one of the ends of the cable 25-6, which end is currently disconnected from any PHY, is coupled to the PHY 23-5a of the DE-CM 21-5. Besides, on the second route, one of the ends of the cable 26-6, which end is currently disconnected from any PHY, is coupled to the PHY 24-5a of the DE-CM 22-5. Since the couplings vary the coupling configurations of both the first route and the second route, the CE-CMs 11' and 12' of the CE 10' and the DE-CMs 21 and 22 of the DEs 20 create or update the respective route tables. Consequently, the first route and the second route are both coupled into loops. Accordingly, when route tables for the first route are to be created, the loop detector 114 of the DE-CM 11' detects the presence of the loop and the loop selector 115 selects one of the initiators 114a' and 114b' (invalidating the other initiator unselected). When route tables for the second route are to be created, the loop detector 124 of the CE-CM 12' detects the presence of the loop and the loop selector 125 selects one of the initiators 124a' and 124b (invalidating the other initiator unselected).

The above procedure accomplishes the addition of the DE 20-5.

As a consequence, the storage device 1' of this modification to the second embodiment can increase a DE without halting the system through the use of hot-swapping scheme, so that, even during addition of a DE to the storage device 1', the operation of the device 1' can be continued.

Specifically, even during the addition of a DE, since both the first route and the second route couples from the CE 10' through the DE 20-4, the storage device 1' continues to be capable of accessing the storing sections 28-1 through 28-4 of the DE 20-1 through 20-4.

The procedure of adding a DE (i.e., the order of coupling cables) are not limited to the above.

For example, after the first procedural step that one end of the cable 25-6 for the first route is disconnected from the PHY 23-4a of the DE-CM 21-4 and one end of the cable 26-6 for the second route is disconnected from the PHY 24-4a of the DE-CM 22-4, coupling of the first route may be completed first so that the CE-CM 11' through the DE-CM 21-5 are coupled into a loop, and then coupling of the second route may be completed.

With this configuration, even when a failure is caused in one of the DEs during addition of a DE, the access controller 113' of the CE-CM 11' can selectively switch the routes associated with the PHYs 13a or 13b in accordance with a storing section to be accessed. Accordingly, storing section that cannot be accessed through the second route due to the failure of the DE, the storing section can be accessed from the CE 10' without interruption.

(D) Others:

The preferable embodiments of the present invention are detailed as the above. However, the present invention should by no means be limited to those embodiments, and various modifications and changes can be suggested without departing from the gist of the present invention.

The functions of the route table creating sections 112, 122, 212, and 222; the access controllers 113, 113', 123, and 123'; initiators 114a, 114a', 114b, 114b', 124a, 124a', 124b, and 124b'; and the loop selectors 115 and 125 can be realized by a computer (including a CPU, an information processor, and various terminals) executing one or more predetermined application programs.

The programs may be provided in the form of being stored in a computer-readable recording medium, such as a flexible disk, a CD (e.g., CD-ROM, CD-R, CD-RW), a DVD (e.g., DVD-ROM, DVD-RAM, DVD-R, DVD-RW, DVD+R, DVD+RW), a magnetic disk, an optical disk, or a magneto-optical disk. In this case, a computer reads the programs from the recording medium and sends the read programs to an internal or external memory to store for use. Alternatively, the programs maybe recorded in a memory device (a recording medium), such as a magnetic disk, an optical disk or a magneto-optical disk, and is provided to a computer from the memory device through a communication path.

Here, a computer is a concept of a combination of hardware and an Operating System (OS) and means hardware which operates under control of the OS. Otherwise, if an application program operates hardware independently of an OS, the hardware corresponds to the computer. Hardware includes at least a microprocessor such as a CPU and means to read a computer program recorded in a recording medium.

The above application program includes program codes that cause the computer to realize the above functions. Part of the functions may be realized by the OS, not by the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A storage device comprising:
a controller enclosure that includes a storing section; and a first controller and a second controller that carry out redundant access control on the storing section;
two or more additional enclosures, serially coupled to the controller enclosure, each of which includes an additional storing section and a first additional controller and a second additional controller that carry out redundant access control on the additional storing section;
a first route through which the first controller of the controller enclosure is serially coupled to the first additional controllers of the additional enclosures; and
a second route through which the second controller of the controller enclosure is serially coupled to the second additional controllers of the additional enclosures, wherein
the order of coupling the first additional controllers on the first route is identical to an order of adding the additional enclosures, and
the order of coupling the second additional controllers on the second route is different from the order of adding the additional enclosures.

2. A storage device, comprising:
a controller enclosure that includes a storing section, and first and second controllers that carry out redundant access control on the storing section;
additional enclosures, serially coupled to the controller enclosure, each including an additional storing section, and first and second additional controllers that carry out redundant access control on the additional storing section;
a first route through which the first controller of the controller enclosure is serially coupled to the first additional controller in each of the additional enclosures; and
a second route through which the second controller of the controller enclosure is serially coupled to the second additional controllers of the additional enclosures,
wherein a first order of coupling the first additional controllers on the first route is identical to the first order of adding the additional enclosures;
wherein a second order of coupling the second additional controllers on the second route is different from the first order of adding the additional enclosures;
wherein each of the first controller, the second controller, the first additional controllers, and the second additional controllers comprises:
a route table creating section that creates a route table specifying an access route to the additional storing section of each additional enclosure serially coupled downstream of the controller, and
a route table storing section that stores the route table created by the route table creating section;
wherein the first controller comprises a first access controller that determines the access route along the first route with reference to the route table stored in the route table storing section of the first controller and accesses the additional storing sections in the additional enclosures serially coupled to downstream of the first controller through the first route; and
wherein the second controller comprises a second access controller that determines the access route along the second route to be the access route with reference to the route table stored in the route table storing section of the second controller and accesses the additional storing sections in the additional enclosures serially coupled to downstream of the second controller through the second route.

3. The storage device according to claim 2, wherein each of the first controller and the second controller further comprises:
a detector that detects whether the corresponding one of the first route and the second route is in a loop form; and a selector that selects, when the detector detects that the corresponding route is in the loop form, one of the two circumferential directions and causes the route table creating section to create the route table in which the additional enclosures are assumed to be serially coupled in an order corresponding to the selected circumferential directions.

4. The storage device according to claim 3, wherein the detectors of the first controller and the second controller determines that the first route or the second route is in a loop form when creation of the route tables by the route table creating sections included in the controller enclosure does not finish and/or when the route tables of the first controller or the second controller in the controller enclosure store information of the controller of the controller enclosure.

5. A method for adding an additional enclosure into a storage device comprising a controller enclosure that includes a storing section; and a first controller and a second controller that carry out redundant access control on the storing section; two or more of the additional enclosures, serially coupled to the controller enclosure, each of which includes an additional storing section and a first additional controller and a second additional controller that carry out redundant access control on the additional storing section; a first route through which the first controller of the controller enclosure is serially coupled to the first additional controllers of the additional enclosures; and a second route through which the second controller of the controller enclosure is serially coupled to the second additional controllers of the additional enclosures, wherein the order of coupling the first additional controllers on the first route is identical to an order of adding the additional enclosures, and the order of coupling the second additional controllers on the second route is different from the order of adding the additional enclosures, the method comprising:
   serially coupling the first additional controller of the additional enclosure to be added with the first additional controller of the last one of the additional enclosures on the first route; and
   interposing the second additional controller of the additional enclosure to be added between the second controller of the controller enclosure and the second additional controller of the first one of the additional enclosures on the second route such that the second controller of the controller enclosure and the second additional controllers of the additional enclosures are serially coupled to one another.

6. A method for adding an additional enclosure into a storage device comprising a controller enclosure that includes a storing section; and a first controller and a second controller that carry out redundant access control on the storing section; two or more of the additional enclosures, serially coupled to the controller enclosure, each of which includes an additional storing section and a first additional controller and a second additional controller that carry out redundant access control on the additional storing section; a first route through which the first controller of the controller enclosure is serially coupled to the first additional controllers of the additional enclosures; and a second route through which the second controller of the controller enclosure is serially coupled to the second additional controllers of the additional enclosures, wherein the order of coupling the first additional controllers on the first route is identical to an order of adding the additional enclosures, the order of coupling the second additional controllers on the second route is different from the order of adding the additional enclosures, each of the first controller, the second controller, the first additional controllers, and the second additional controllers comprises a route table creating section that creates a route table specifying an access route to the one or more storing sections of the respective additional enclosures serially coupled downstream of the controller, and a route table storing section that stores the route table created by the route table creating section; the first controller comprises a first access controller that determines the access route along the first route with reference to the route table stored in the route table storing section of the first controller and accesses the additional storing sections in the additional enclosures serially coupled to downstream of the first controller through the first route; the second controller comprises a second access controller that determines the access route along the second route to be the access route with reference to the route table stored in the route table storing section of the second controller and accesses the additional storing sections in the additional enclosures serially coupled to downstream of the second controller through the second route, and each of the first controller and the second controller further comprises a detector that detects whether the corresponding one of the first route and the second route is in a loop form and a selector that selects, when the detector detects that the corresponding route is in the loop form, one of the two circumferential directions and causes the route table creating section to create the route table in which the additional enclosures are assumed to be serially coupled in an order corresponding to the selected circumferential directions, the method comprising:
   serially coupling, in sequence, the first controller of the controller enclosure, the first additional controller of the additional enclosure to be added, and the first additional controller of the last one of the additional enclosures on the first route so that the first route is thereby formed into a loop;
   coupling the second controller of the controller enclosure with the second additional controller of the last one of the additional enclosures on the second route so that the second route is formed into a loop form;
   after forming the second route into the loop form, interposing the second additional controller of the additional enclosure to be added between the second controller of the controller enclosure and the second additional controller of the first one of the additional enclosures on the second route such that the second controller, the second additional controller of the additional enclosure to be added, and the second additional controller of the first one of the additional enclosures on the second route are sequentially coupled;
   after serially coupling the second additional controller of the additional enclosure to be added, disconnecting the first additional controller of the additional enclosure to be added from the first controller on the first route and disconnecting the second controller from the second additional controller of the last one of the additional enclosures on the second route.

* * * * *